(12) United States Patent
Lee

(10) Patent No.: US 9,938,994 B2
(45) Date of Patent: Apr. 10, 2018

(54) DISSOLVER TUBE HAVING MESH SCREEN, AND METHOD FOR PRODUCING MESH SCREEN

(71) Applicant: Yu Hyung Lee, Seoul (KR)

(72) Inventor: Yu Hyung Lee, Seoul (KR)

( * ) Notice: Subject to any disclaimer, the term of this patent is extended or adjusted under 35 U.S.C. 154(b) by 0 days.

(21) Appl. No.: 15/302,200

(22) PCT Filed: Apr. 15, 2015

(86) PCT No.: PCT/KR2015/003777
§ 371 (c)(1),
(2) Date: Oct. 6, 2016

(87) PCT Pub. No.: WO2015/160182
PCT Pub. Date: Oct. 22, 2015

(65) Prior Publication Data
US 2017/0030385 A1  Feb. 2, 2017

(30) Foreign Application Priority Data

Apr. 15, 2014 (KR) .................. 10-2014-0044804
Dec. 31, 2014 (KR) .................. 10-2014-0194813

(51) Int. Cl.
| F15D 1/02 | (2006.01) |
| F15D 1/00 | (2006.01) |
| C02F 1/78 | (2006.01) |
| B01F 5/06 | (2006.01) |
| B01F 5/10 | (2006.01) |

(52) U.S. Cl.
CPC ............ *F15D 1/001* (2013.01); *B01F 5/0693* (2013.01); *B01F 5/106* (2013.01); *C02F 1/78* (2013.01); *C02F 2201/784* (2013.01); *C02F 2301/066* (2013.01); *C02F 2303/04* (2013.01)

(58) Field of Classification Search
CPC .................................. F16K 47/08; F15B 11/04
USPC ................................. 138/44, 41; 60/737, 723
See application file for complete search history.

(56) References Cited

U.S. PATENT DOCUMENTS

| 2,760,371 A | * | 8/1956 | Borden | F02M 1/00 |
| | | | | 138/40 |
| 3,894,562 A | * | 7/1975 | Moseley, Jr. | F15D 1/02 |
| | | | | 138/44 |
| 4,105,721 A | * | 8/1978 | Schliebe | B01F 5/0413 |
| | | | | 138/44 |
| 4,743,405 A | * | 5/1988 | Durao | B01F 5/0475 |
| | | | | 261/76 |

(Continued)

FOREIGN PATENT DOCUMENTS

| CN | 204638182 U | * | 9/2015 |
| JP | 2007-105691 A | | 4/2007 |

(Continued)

*Primary Examiner* — Patrick F Brinson

(57) ABSTRACT

There is provided a dissolver tube to generate a pressure change to a fluid to change a physical property of the fluid, the tube comprising: a hollow tubular outer body; an inlet cap coupled to the body at an inlet thereof; an outlet cap coupled to the body at an outlet thereof; and a plurality of mesh screens arranged between the inlet cap and outlet cap, wherein each mesh screen has a plurality of micro-holes formed therethrough, each micro-hole having a Venturi structure, thereby to momentarily continuously contract, relax, and shear the fluid passing through the tube.

9 Claims, 26 Drawing Sheets

(56) References Cited

U.S. PATENT DOCUMENTS

| | | | | |
|---|---|---|---|---|
| 5,918,637 | A * | 7/1999 | Fleischman | B01D 3/008 138/40 |
| 6,442,939 | B1 * | 9/2002 | Stuttaford | F23D 14/64 60/723 |
| 6,983,600 | B1 * | 1/2006 | Dinu | F23R 3/40 60/39.822 |
| 9,200,650 | B2 * | 12/2015 | Van Buskirk | F15D 1/025 |
| 9,410,565 | B2 * | 8/2016 | Van Buskirk | F15D 1/025 |
| 9,746,856 | B2 * | 8/2017 | Hirata | G05D 7/0635 |
| 2006/0000217 | A1 | 1/2006 | Dinu | |
| 2006/0000218 | A1 * | 1/2006 | Dinu | F23R 3/286 60/737 |
| 2012/0222744 | A1 * | 9/2012 | Maslak | B01F 3/0807 137/1 |

FOREIGN PATENT DOCUMENTS

| | | |
|---|---|---|
| JP | 2010201397 A * | 9/2010 |
| KR | 10-0816487 B1 | 3/2008 |
| KR | 10-2008-0078334 A | 8/2008 |
| KR | 10-0857613 B1 | 9/2008 |
| KR | 10-2010-0075145 A | 7/2010 |
| KR | 10-2012-0002678 A | 1/2012 |
| KR | 10-2013-0035435 A | 4/2013 |
| KR | 10-2013-0125589 A | 11/2013 |
| KR | 10-2014-0035193 A | 3/2014 |

* cited by examiner (a)

(b)

(c)

(a)

(b)

(c)

NUMBER OF VENTURI-SHAPE HOLES

| 1 inch | RECTANGULAR AREA | NUMBER OF RECTANGULAR HOLES | LINE NUMBER | TOTAL NUMBER OF HOLES | |
|---|---|---|---|---|---|
| | 625 | 18225 | 135 | NUMBER OF PIECES | NUMBER OF PADS |
| mm | CIRCULAR AREA | NUMBER OF CIRCULAR HOLES | REMARK | 25 | 3 |
| 6 | 28 | 824 | | 20,602 | 61,805 |
| 8 | 50 | 1,465 | | 36,625 | 109,875 |
| 15 | 177 | 5,150 | | 128,760 | 386,279 |
| 20 | 314 | 9,156 | | 228,906 | 686,718 |
| 25 | 491 | 14,307 | | 357,666 | 1,072,997 |
| 32 | 804 | 23,440 | | 585,999 | 1,757,998 |
| 40 | 1,256 | 36,625 | | 915,624 | 2,746,872 |
| 50 | 1,963 | 57,227 | | 1,430,663 | 4,291,988 |
| 65 | 3,317 | 96,713 | | 2,417,820 | 7,253,459 |
| 80 | 5,024 | 146,500 | | 3,662,496 | 10,987,488 |
| 90 | 6,359 | 185,414 | | 4,635,347 | 13,906,040 |
| 100 | 7,850 | 228,906 | | 5,722,650 | 17,167,950 |
| 125 | 12,266 | 357,666 | | 8,941,641 | 26,824,922 |
| 150 | 17,663 | 515,039 | | 12,875,963 | 38,627,888 |
| 200 | 31,400 | 915,624 | | 22,890,600 | 68,671,800 |
| 250 | 49,063 | 1,430,663 | | 35,766,563 | 107,299,688 |
| 300 | 70,650 | 2,060,154 | | 51,503,850 | 154,511,550 |
| 350 | 96,163 | 2,804,099 | | 70,102,463 | 210,307,388 |
| 400 | 125,600 | 3,662,496 | | 91,562,400 | 274,687,200 |
| 450 | 158,963 | 4,635,347 | | 115,883,663 | 347,650,988 |
| 500 | 196,250 | 5,722,650 | | 143,066,250 | 429,198,750 |

FIG. 8

| 1 inch | RECTANGULAR AREA | NUMBER OF RECTANGULAR HOLES | LINE NUMBER | | TOTAL NUMBER OF HOLES | |
|---|---|---|---|---|---|---|
| | 625 | 18225 | 135 | | NUMBER OF PIECES | NUMBER OF PADS |
| mm | CIRCULAR AREA | NUMBER OF CIRCULAR HOLES | REMARK | | 25 | 3 |
| 6 | 28 | 824 | | | 20,602 | 61,805 |
| 8 | 50 | 1,465 | | | 36,625 | 109,875 |
| 15 | 177 | 5,150 | | | 128,760 | 386,279 |
| 20 | 314 | 9,156 | | | 228,906 | 686,718 |
| 25 | 491 | 14,307 | | | 357,666 | 1,072,997 |
| 32 | 804 | 23,440 | | | 585,999 | 1,757,998 |
| 40 | 1,256 | 36,625 | | | 915,624 | 2,746,872 |
| 50 | 1,963 | 57,227 | | | 1,430,663 | 4,291,988 |
| 65 | 3,317 | 96,713 | | | 2,417,820 | 7,253,459 |
| 80 | 5,024 | 146,500 | | | 3,662,496 | 10,987,488 |
| 90 | 6,359 | 185,414 | | | 4,635,347 | 13,906,040 |
| 100 | 7,850 | 228,906 | | | 5,722,650 | 17,167,950 |
| 125 | 12,266 | 357,666 | | | 8,941,641 | 26,824,922 |
| 150 | 17,663 | 515,039 | | | 12,875,963 | 38,627,888 |
| 200 | 31,400 | 915,624 | | | 22,890,600 | 68,671,800 |
| 250 | 49,063 | 1,430,663 | | | 35,766,563 | 107,299,688 |
| 300 | 70,650 | 2,060,154 | | | 51,503,850 | 154,511,550 |
| 350 | 96,163 | 2,804,099 | | | 70,102,463 | 210,307,388 |
| 400 | 125,600 | 3,662,496 | | | 91,562,400 | 274,687,200 |
| 450 | 158,963 | 4,635,347 | | | 115,883,663 | 347,650,988 |
| 500 | 196,250 | 5,722,650 | | | 143,066,250 | 429,198,750 |

FIG. 9

| 1 inch | RECTANGULAR AREA | NUMBER OF RECTANGULAR HOLES | LINE NUMBER | TOTAL NUMBER OF HOLES | |
|---|---|---|---|---|---|
| | 625 | 15625 | 125 | NUMBER OF PIECES | NUMBER OF PADS |
| mm | CIRCULAR AREA | NUMBER OF CIRCULAR HOLES | REMARK | 25 | 3 |
| 6 | 28 | 707 | | 17,663 | 52,988 |
| 8 | 50 | 1,256 | | 31,400 | 94,200 |
| 15 | 177 | 4,416 | | 110,391 | 331,172 |
| 20 | 314 | 7,850 | | 196,250 | 588,750 |
| 25 | 491 | 12,266 | | 306,641 | 919,922 |
| 32 | 804 | 20,096 | | 502,400 | 1,507,200 |
| 40 | 1,256 | 31,400 | | 785,000 | 2,355,000 |
| 50 | 1,963 | 49,063 | | 1,226,563 | 3,679,688 |
| 65 | 3,317 | 82,916 | | 2,072,891 | 6,218,672 |
| 80 | 5,024 | 125,600 | | 3,140,000 | 9,420,000 |
| 90 | 6,359 | 158,963 | | 3,974,063 | 11,922,188 |
| 100 | 7,850 | 196,250 | | 4,906,250 | 14,718,750 |
| 125 | 12,266 | 306,641 | | 7,666,016 | 22,998,047 |
| 150 | 17,663 | 441,563 | | 11,039,063 | 33,117,188 |
| 200 | 31,400 | 785,000 | | 19,625,000 | 58,875,000 |
| 250 | 49,063 | 1,226,563 | | 30,664,063 | 91,992,188 |
| 300 | 70,650 | 1,766,250 | | 44,156,250 | 132,468,750 |
| 350 | 96,163 | 2,404,063 | | 60,101,563 | 180,304,688 |
| 400 | 125,600 | 3,140,000 | | 78,500,000 | 235,500,000 |
| 450 | 158,963 | 3,974,063 | | 99,351,563 | 298,054,688 |
| 500 | 196,250 | 4,906,250 | | 122,656,250 | 367,968,750 |

FIG. 10

DISSOLVER TUBE HAVING MESH SCREEN, AND METHOD FOR PRODUCING MESH SCREEN

BACKGROUND

Field of the Present Disclosure

The present disclosure relates a dissolver tube to improve water sterilization and/or dissolution of liquids or gas into water, and, more particularly, to a dissolver tube to momentarily continuously contract, relax and shear water passing therethrough to improve water sterilization and/or soften water and/or dissolution of liquids or gas into water, and a method for manufacturing a master screen roller for the tube.

Discussion of Related Art

To improve water sterilization passing through a pipe, chlorine or ozone gas is injected into water. In order to improve ozone dissolution, a pump may be used to increase water pressure in the pipe.

Ozone may be decomposed via a hydroxyl group into hydroperoxy radicals $HO_2$ and superoxide radicals $O_2-$, which may react with ozone, to produce ozonide radicals $O_3-$ and, then, to produce OH radicals. The OH radicals may have potential difference from ozone (by 3.08V), and, thus may react rapidly with all types of organic materials. However, ozone may react slowly with organic materials or may not react with some types of organic materials.

When chlorine is injected into water, trihalomethane will remain in water. This component may cause a pollution or cancer.

When the ozone gas is injected into water, an ozone gas generator may be required which may be expensive. Further, to drive a pump motor may consume a further electric energy. Further, a pipe size may increase to increase a facility.

That is, conventionally, to improve water sterilization and/or soften water and/or dissolution of liquids or gas into water, energy consumption may increase, the facility may increase, and work time and labor power may increase, and an ozone discharging device may be required. Thus, with high efficiency and low cost, water sterilization and/or soften water and/or dissolution of liquids or gas into water may not be improved using the conventional approach.

SUMMARY

The present disclosure is to provide a dissolver tube to momentarily continuously contract, relax and shear water passing therethrough to improve OH radicals production, to improve water sterilization and/or soften water.

The present disclosure is further to provide a method for manufacturing a master screen roller for the mesh screen for the dissolver tube.

The present disclosure is further to provide a method for manufacturing a mesh screen for the dissolver tube using an electroforming process.

In one aspect, there is provided a dissolver tube to generate a pressure change to a fluid to change a physical property of the fluid, the tube comprising:
 a hollow tubular outer body;
 an inlet cap coupled to the body at an inlet thereof;
 an outlet cap coupled to the body at an outlet thereof; and
 a plurality of mesh screens arranged between the inlet cap and outlet cap,
 wherein each mesh screen has a plurality of micro-holes formed therethrough, each micro-hole having a Venturi structure, thereby to momentarily continuously contract, relax, and shear the fluid passing through the tube.

In one implementation, the Venturi structure has a maximum constricted portion, and the plurality of micro-holes is arranged in a grid pattern.

In one implementation, each micro-hole has a first tilted face toward the maximum constricted portion and a second tilted face toward the maximum constricted portion, and the first and second tilted faces meet at the maximum constricted portion, wherein the first tilted face is shorter than the second tilted face.

In one implementation, each micro-hole is oriented such that the first tilted face thereof is located upstream of the second tilted face thereof in terms of a fluid flow direction.

In one implementation, each of the plurality of mesh screens extends in an angled manner to a flow path direction in the tube.

In one implementation, the plurality of mesh screens is divided into a plurality of groups and the groups are spaced from each other via a pad.

In one implementation, at least one of an inlet and outlet of the micro-hole is defined in a circular or polygonal shape.

In one implementation, each of the plurality of mesh screens extends in an angled manner to a flow path direction in the tube.

In one implementation, each of the plurality of mesh screens is plated with gold or platinum.

In one aspect, there is provided a method for manufacturing a master screen roller for a target screen roller, the target screen roller having a plurality of micro-holes formed therethrough, each micro-hole having a Venturi structure, the target screen roller being produced using an electroforming process, the method comprising:
 providing a cylindrical cylindrical rotary screen roller having a plurality of recesses formed at a surface thereof;
 filling silicon into the recesses of the rotary screen roller;
 drying the rotary screen roller with the filled silicon at 40 to 50° C. for at least 12 hours; and
 smoothening a surface of the dried rotary screen roller. In one implementation, the silicon is electrically non-conductive.

In one implementation, the filling of the silicon comprises: fitting end rings with the rotary screen roller at both ends thereof;
 inserting a support rod into the rotary screen roller;
 applying the silicon on the rotary screen roller; and
 uniformly filling the silicon entirely on the rotary screen roller using a blade while the rotary screen roller is rotated.

In one implementation, in uniformly filling the silicon entirely on the rotary screen roller using the blade, a pressure force onto the blade is substantially equal to an elastic force of the rotary screen roller.

In one implementation, the smoothening of a surface of the dried rotary screen roller comprises:
 inserting the dried rotary screen roller into the support rod without the end rings; and
 cleaning the surface of the rotary screen roller using a cloth to remove the silicon therefrom.

In one aspect, there is provided a method for manufacturing a screen roller using an electroforming process, the screen roller having a plurality of micro-holes formed therethrough, each micro-hole having a Venturi structure, the method comprising:
 providing a rotary screen roller having micro-holes formed therethrough, each micro-hole having a Venturi structure, the micro-holes being arranged in a grid pattern;

filling silicon into the micro-holes in the rotary screen roller and cleaning the surface of the rotary screen roller to produce a master screen roller;

conducting a first electroforming process using the master screen roller to form a thin film screen roller;

separating the thin film screen roller; and conducting a second electroforming process using the thin film screen roller to form a duplicate screen roller.

In one implementation, the first electroforming process includes: inserting the master screen roller into a rotation axis; and conducting an electroforming process using the master screen roller with rotation of the master screen roller while the master screen roller is immersed in a platting solution.

In one implementation, the first electroforming process includes: inserting end rings into the master screen rollers at both ends thereof for a weight balancing; and transferring a negative electrode power from the rotation axis via the end rings to the thin film screen roller.

In one implementation, the separating of the thin film screen roller comprising:

inserting an elongate stripping rod into the thin film plated master screen roller produced by the first electroforming, wherein the elongate rod has a heart-shaped cross-section with a grooved top; and inserting a rotation rod into the groove in the elongate stripping rod and rotating the rotation rod to separate the thin film plated master screen roller.

In one implementation, the second electroforming process includes: inserting the rotation axis into the thin film screen roller; filling a plating material in the thin film screen roller, and disposing an inner basket in a fixed manner, and disposing a balancing rod in a non-fixed manner; and immersing the thin film screen roller in the plating solution and rotating the rotation axis to conduct the electroforming.

In one implementation, the balancing rod is made of an electrically non-conductive, and has a plurality of holes formed therein.

In one implementation, the balancing rod thickness is set such that the inner basket thickness<the balancing rod thickness<the rotation axis thickness.

In one implementation, the balancing rod length is equal to or larger than a length of the thin film screen roller.

In one implementation, the balancing rod weight is larger than the thin film screen roller weight.

The OH radicals may be formed when $O_3$ is dissolved in water and is reduced.

In order to produce OH radicals much, a large amount of ozone gas should be dissolved in water. Thus, the ozone dissolver system should produce ozone water with high ozone concentration.

When the ozone gas is injected excessively, the ozone may be discharged. Thus, the ozone discharging device may be required.

The present dissolver tube may improve the ozone dissolution in using an ozone containing water. Further, the present dissolver tube may be applied to an approach using an ozone-free water to improve water sterilization.

The dissolver tube may momentarily continuously contract, relax and shear water passing therethrough to improve water sterilization and/or soften water and/or dissolution of liquids or gas into water.

BRIEF DESCRIPTION OF THE DRAWINGS

FIG. 8 to FIG. 10 illustrate a number of Venturi structured micro-holes in the mesh screen.

DETAILED DESCRIPTIONS

Figure 13:
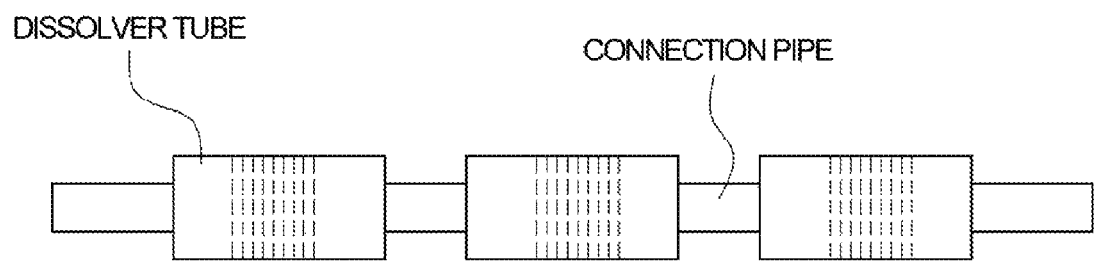
FIG. 13 and FIG. 14 illustrate example arrangements of plural dissolver tubes of the present disclosure.
Figure 14:
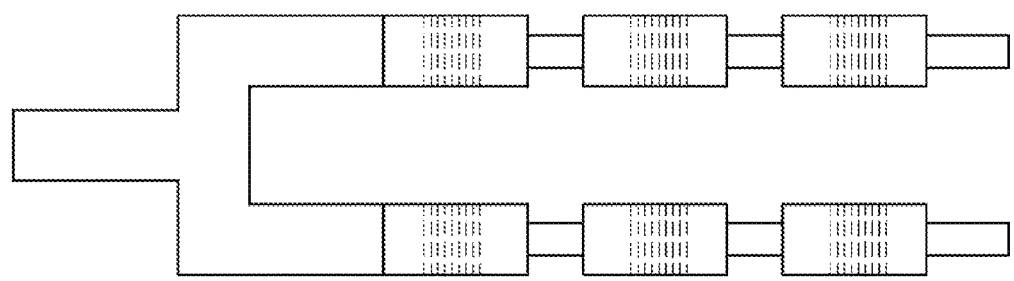

Referring to FIG. 13 and FIG. 14, as for the approach using ozone containing water (hereinafter, the first approach), when a micro-hole in the mesh screen has a small size, a number of the mesh screens is larger, or the ozone tube diameter is larger than the connection pipe diameter, the ozone dissolution may be improved.

As for the approach using ozone free water (hereinafter, the second approach), the dissolver tube should have a higher pressure applied there to than the connection pipe (for the purpose of sterilization). However, for the purpose for softening water, the dissolver tube may have a low pressure applied there.

The ozone dissolution may be adjusted by the pressure application. For the second approach, the dissolver tube only changes the gas or liquid in the dissolver tube, and, thus, an instant pressure application may be required. The second approach may require the higher pressure than the first approach. This may be achieved using a plurality of mesh screens in accordance with the present disclosure.

Embodiments

Hereinafter, the present disclosure will be provided in details in terms of a configuration and operation.

Figure 1:
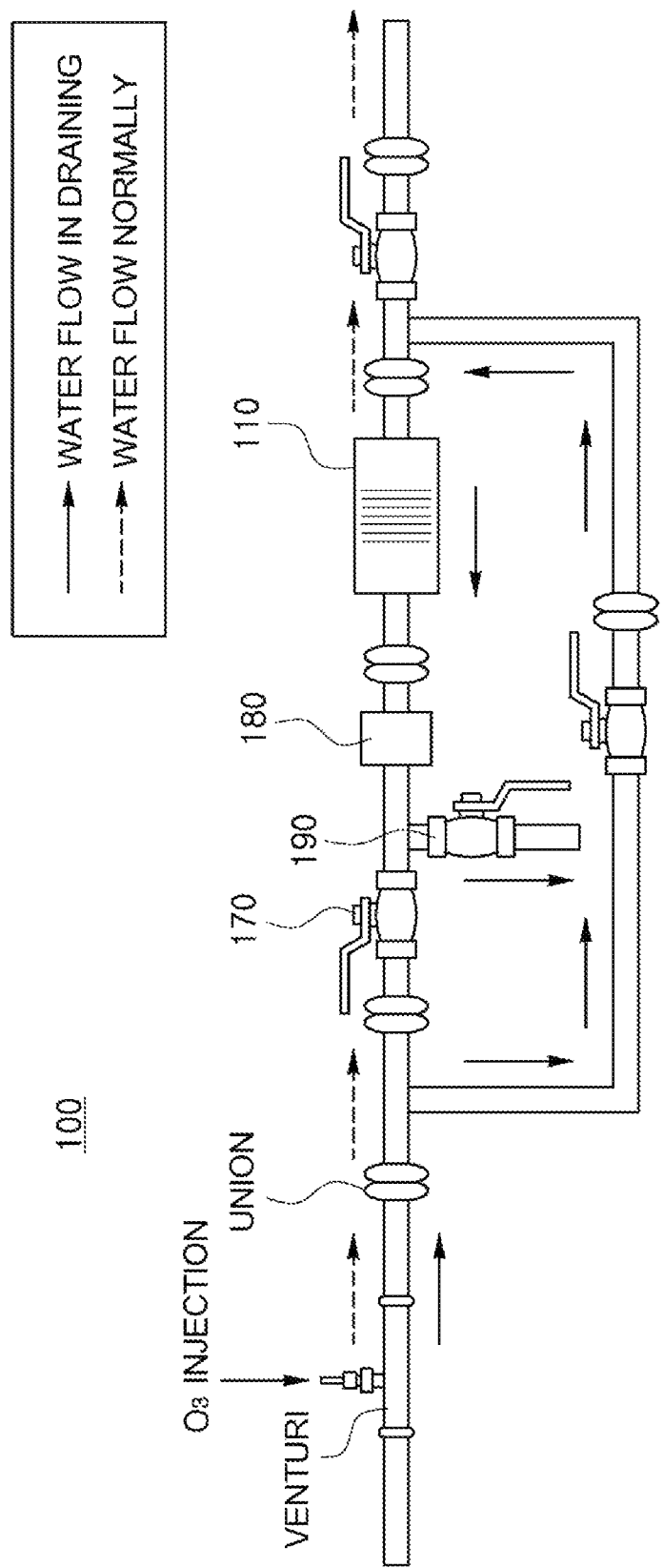
FIG. 1 illustrates an overall configuration of a dissolver system having a dissolver tube in accordance with the present disclosure.

FIG. 1 illustrates an overall configuration of a dissolver system having a dissolver tube in accordance with the present disclosure.

Referring to FIG. 1, the dissolver system 100 may include a dissolver tube 110, a ball valve 170, a filter 180, a drain valve 190, a counter-flow valve 200, and an outlet valve 210.

The dissolver tube 110 may have a plurality of mesh screens, each screen having a plurality of micro-holes defined therein, each micro-hole having a Venturi structure. Thus, the tube 110 may act to momentarily and continuously contract, relax and shear water entering therein to improve an ozone dissolution or water sterilization.

Figure 2:
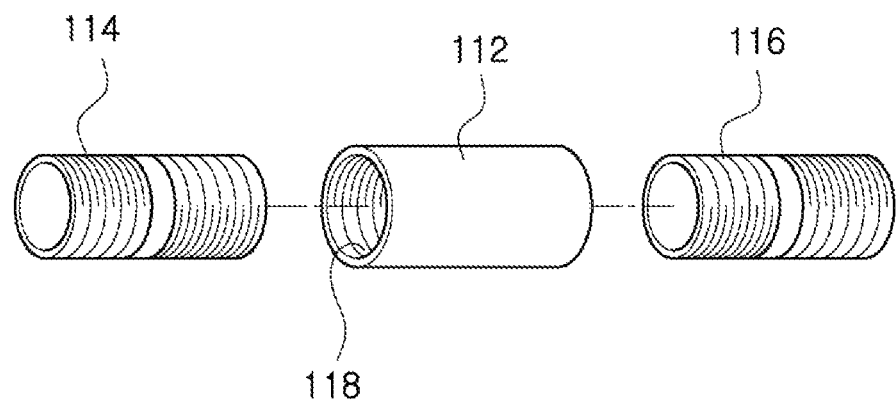
FIG. 2 to FIG. 3 illustrate a detailed configuration of the dissolver tube in FIG. 1.
Figure 3:
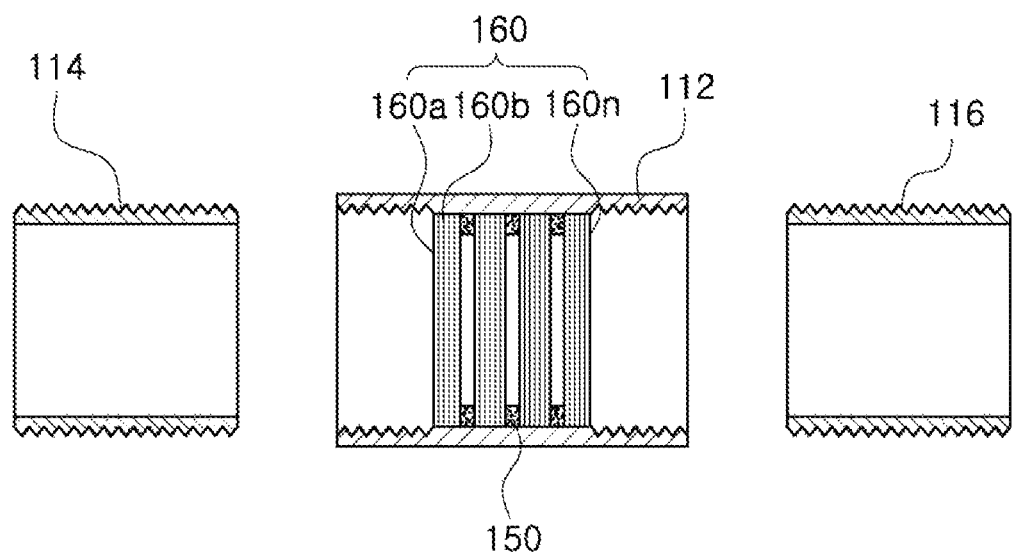

FIG. 2 to FIG. 3 illustrate a detailed configuration of the dissolver tube in FIG. 1.

First, referring to FIG. 2, the present dissolver tube 110 may include an outer body 112, an inlet cap 114, and an outlet cap 116. Between the inlet cap 114 and outlet cap 116, a plurality of mesh screens 160a to 160n may be disposed.

The outer body 112 may be made of a material having a resistance against high or low temperature water or chemicals. The outer body 112 may be coupled to the inlet cap 114 at an inlet thereof and to outlet cap 116 at an outlet thereof in a water communication manner. For this, the outer body 112 may be hollow.

Each of the inlet cap 114 and outlet cap 116 may be made of a material having a resistance against high or low temperature water or chemicals. Each of the inlet cap 114 and outlet cap 116 may be detachably coupled to the body. Each of the inlet cap 114 and outlet cap 116 may be hollow.

Each of the inlet cap 114 and outlet cap 116 may have threads formed in an outer face thereof to be engaged with the threads formed in the body 112.

Thus, the inlet cap 114 and outlet cap 116 may be screw-coupled to the outer body 112 in in a water communication manner.

Between the inlet cap 114 and outlet cap 116, a plurality of mesh screens 160a to 160n may be disposed. Each of the mesh screens 160a to 160n may have a plurality of micro-holes, each micro-hole having a cross section of a Venturi structure. The micro-holes may be arranged in a grid form. The mesh screens 160a to 160n may be adjacent. In one example, the mesh screens may be grouped into multiple groups which may be spaced from each other via a washer, pad, etc. 150. In this connection, the pad 150 may have a ring shape.

The mesh screen 160 may have an outer perimeter shape corresponding to the inner perimeter shape of the dissolver tube 118. For example, the dissolver tube 110 may have the inner perimeter shape of a circle, an elliptical shape, a polygonal shape, etc. The number of the arranged mesh screens 160 may depend on capacity and/or concentration of sterilizing water.

In this connection, the mesh screen 160 may be coated using a material having high resistance to ozone such as gold or platinum. Using the ozone containing sterilizing water, the mesh screen 160 may be coated using a material having high resistance to ozone such as gold or platinum. Using ozone-free sterilizing water, the mesh screen 160 may be coated using a material for the purpose of any function including the sterilization, for example, silver, platinum, etc.

Figure 4:
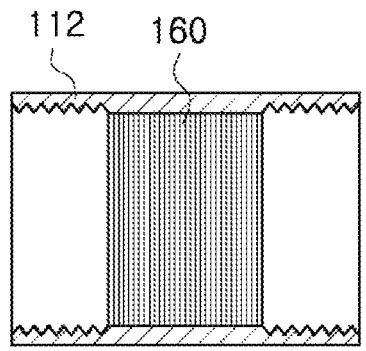
FIG. 4 illustrates example arrangements of mesh screens.
Figure 4:
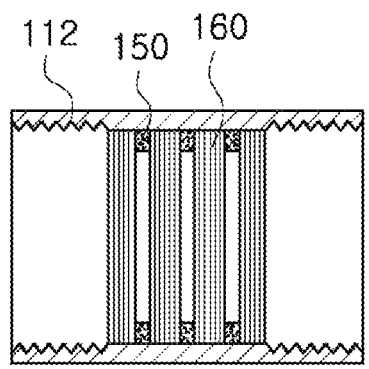
Figure 4:
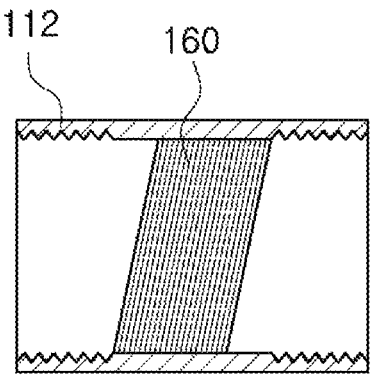

FIG. 4 illustrates example arrangements of mesh screens.

As shown in FIG. 4a, the mesh screens 160 may be arranged continuously, and each screen may extend perpendicular to the wall of the body 120. As shown in FIG. 4b, the mesh screens 160 may be grouped into multiple groups which may be spaced from each other via the pad 150. As shown in FIG. 4c, the mesh screens 160 may be arranged continuously, and each screen may extend in an angled manner to the wall of the body 120.

Figure 5:
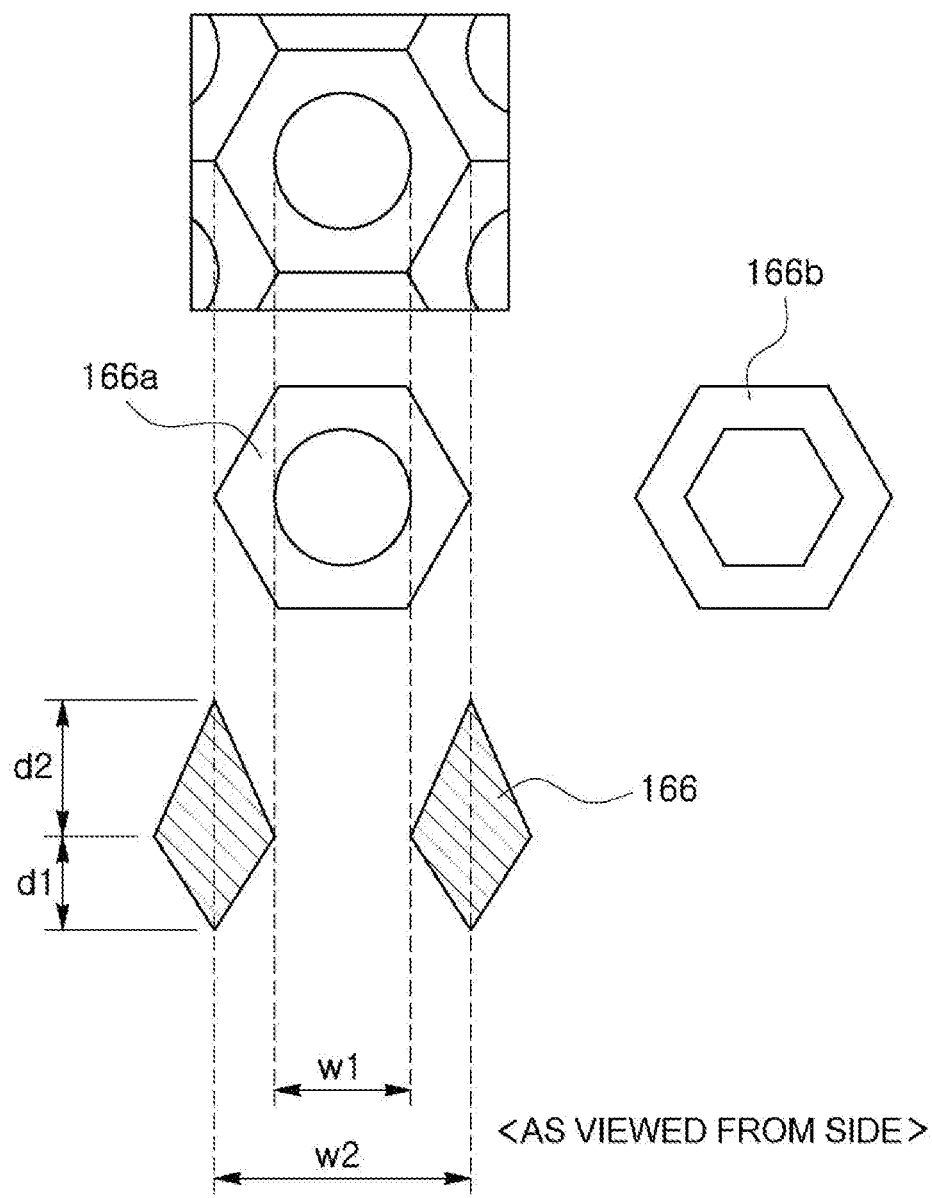
FIG. 5 and FIG. 6 illustrate configurations of micro-holes having the Venturi structure, as formed in the mesh screen.
Figure 6:
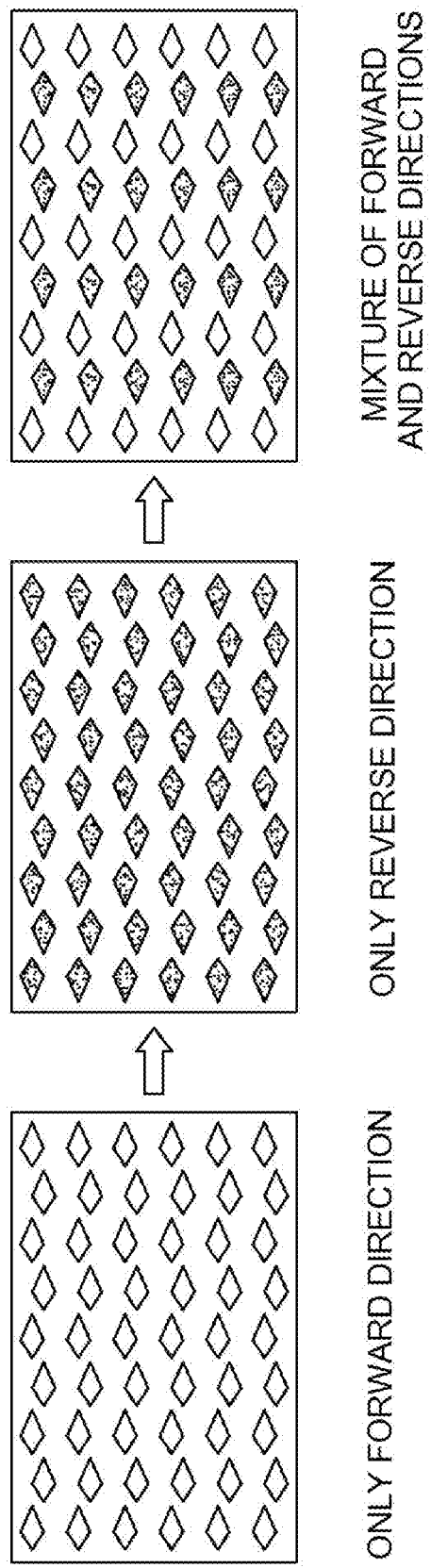
Figure 7:
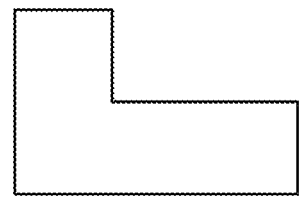
FIG. 7 illustrates an appearance of a dissolver tube.
Figure 7:
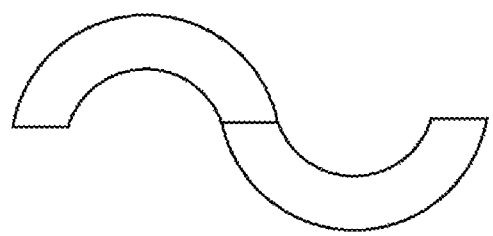
Figure 7:
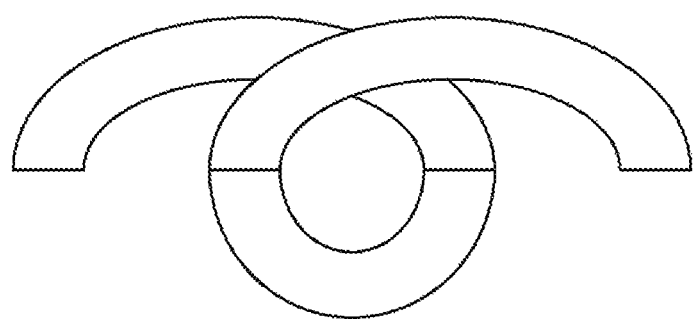

FIG. 5 and FIG. 6 illustrate configurations of micro-holes having the Venturi structure, as formed in the mesh screen. FIG. 7 illustrates an appearance of a dissolver tube.

Referring to FIG. 5, a micro-hole 166 having the Venturi structure may have a cross-section of a circle, a polygonal shape, etc. as view from a front of the screen. The micro-hole 166 may have a Venturi shape along the depth of the micro-hole.

In this connection, the Venturi structure may have a maximum constricted position.

The micro-hole may have a first tilted face having a depth directional length d1 thereof and a second tilted face having a depth directional length d2 thereof, wherein d1 is smaller than d2. The first and second tilted faces may meet at the maximum constricted position to form the maximum constricted section.

The maximum constricted section may have a width w1 which may be, for example, 50 to 60 μm. The inlet and/or outlet section of the micro-hole may have a width w2 which may be, for example, 100 to 120 μm.

The Venturi structure of the micro-hole 166 may cause a pressure change of water therein. This may contract, relax and shear water, to improve an ozone dissolution or water sterilization.

In this connection, a water flow from the first tilted face having the smaller depth directional length d1 thereof to the second tilted face having the larger depth directional length d2 thereof may be referred to as a forward flow. The water flow from the second tilted face to the first tilted face may be referred to as a reverse flow.

Thus, the mesh screens may be arranged such that water flows in the forward flow.

That is, a front of the mesh screen 160 may face toward the inlet cap 114, while a rear of the mesh screen 160 may face toward the outlet cap 116.

Referring to FIG. 6, in a left figure, the micro-holes are arranged such that water flows in the forward flow; in a middle figure, the micro-holes are arranged such that water flows in the reversible flow; in a right figure, the micro-holes are arranged such that water flows in a mixture of the reversible and forward flows.

When the micro-holes are arranged such that water flows in the reversible flow, the discharge amount of the sterilizing water may be reduced. A rapid contract and slow relax may be desired, which may be achieved when the micro-holes are arranged such that water flows in the forward flow.

Further, the plurality of mesh screens 160 may be arranged in a consistent manner in a term of a flow direction. Otherwise, a total effect of the ozone dissolution may be lowered.

Referring to FIG. 7, the dissolver tube may have a L shape (FIG. 7a), a S shape (FIG. 7b), and a twisted shape (FIG. 7c). However, the present disclosure may be limited thereto.

FIG. 8 to FIG. 10 illustrate a number of Venturi structured micro-holes in the mesh screen.

Referring to FIG. 8 to FIG. 10, a number of the Venturi structured micro-holes 166 in the mesh screen 160 may depend on a size of a micro-hole 166.

FIG. 8 and FIG. 9 relate to examples when a "line number" is 135. FIG. 10 relates to an example when a "line number" is 125.

In this connection, the term "line number" refers to a number of lines contained in a unit area (inch). For example, a line number 135 may indicate a number of 135×135 micro-holes.

To be more specific, when the line number is 135 for an area of 40 inch*40 inch, a number of micro-holes may be 40×135×40×135=29,160,000.

Referring back to FIG. 1, the ball valve 170 and counter-flow valve 200 may cause water in the dissolver tube 110 to be counter-flowed to cleanse an inner space in the dissolver tube 110.

The drain valve 190 may act to discharge contaminants filtered via the dissolver tube 110.

Figure 11:
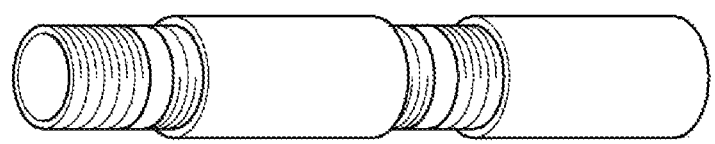
FIG. 11 illustrates an appearance of the dissolver tube in FIG. 1.
Figure 12:
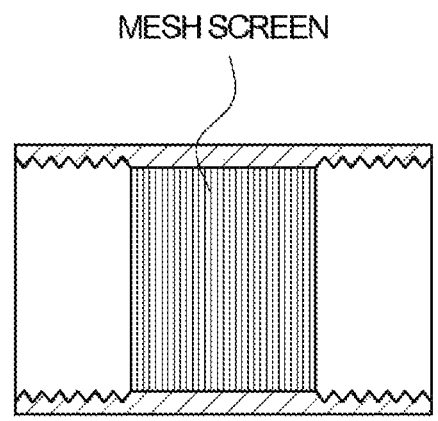
FIG. 12 illustrates an inner configuration of the dissolver tube.

FIG. 11 illustrates an appearance of the dissolver tube in FIG. 1.

Each of the mesh screens 160a to 160n may have a plurality of micro-holes defined therein, each micro-hole having the Venturi structure. Thus, the tube 110 may act to momentarily and continuously contract, relax and shear water entering therein to improve an ozone dissolution or water sterilization.

The present disclosure using the dissolver tube 110 to improve an ozone dissolution or water sterilization may have following effects:

1) As for ozone-free water (waterworks water having 0.20 to 0.26 chlorine measurement)

A fruit, vegetable, fish, meat may be cleaned well and may have a longer fresh state;

A dish may be cleaned well and a surfactant may be removed well;

Fermented foods may be slowed fermented;

Water may be softer;

Contaminations of washing cloths and drains may be lowered;

Foul smell may be removed;

Treated water may be applied to an insect-bitten skin to migrate itching;

After showering and drying a body, a skin may be in a healthy and elastic state;

The skin becomes smooth and refreshed by removing soap ingredients;

The skin feels water softer (like water softeners);

The hair texture becomes soft and strong and the head skin itches less;

Contamination of drains in the bathroom may have a slow progress;

Surfactant may be removed much to allow a good feel of the cloth;

A washing machine may be clean and the smell thereof may be reduced.

2) As for ozone-containing water

Ozone dissolution may be higher and thus high concentration ozone water may be produced with a lower cost.

An amount of discharged ozone may be remarkably reduced.

Ozone dissolution may be higher to produce OH radicals much. Thus, high concentration ozone water above 5 ppm concentration may be produced.

FIG. 13 and FIG. 14 illustrate example arrangements of plural dissolver tubes of the present disclosure.

Referring to FIG. 13, a diameter difference between a connection pipe and an ozone tube may be shown. That is, the dissolver tube diameter may be closely related to the connection pipe diameter as follows:

As for an ozone containing water, dissolver tube diameter>connection pipe diameter (when the ozone is absorbed using the Venturi structure);

As for an ozone-free water, dissolver tube diameter<connection pipe diameter.

The dissolver system as shown in FIG. 1 may be used in following two manners: first, the ozone containing water may pass through the dissolver tube (hereinafter, a first approach) and second, the ozone free water may pass through the dissolver tube (hereinafter, a second approach).

The first and second approaches may be as follows:

As for the first approach, external gases or liquids such as ozone or chlorine may be dissolved in a gas or liquid in the dissolver tube. As for the second approach, any external gases or liquids may not be dissolved in a gas or liquid in the dissolver tube. Thus, using the second approach, only the dissolver tube works to change the gas or liquid in the dissolver tube.

As for the first approach, external gases or liquids such as ozone or chlorine may mainly function rather than the gas or liquid in the dissolver tube. As for the second approach, the gas or liquid in the dissolver tube may be changed to achieve a certain effect.

As for the first approach, when a micro-hole in the mesh screen has a small size, a number of the mesh screens is larger, or the ozone tube diameter is larger than the connection pipe diameter, the ozone dissolution may be improved. As for the second approach, the dissolver tube should have a higher pressure applied there to than the connection pipe (for the purpose of sterilization).

However, for the purpose for softening water, the dissolver tube may have a low pressure applied there.

The ozone dissolution may be adjusted by the pressure application. For the second approach, the dissolver tube only changes the gas or liquid in the dissolver tube, and, thus, an instant pressure application may be required. The second approach may require the higher pressure than the first approach.

The second approach using the ozone-free water may have applications.

1) It may be used in a final stage of a purification system to soften water;

2) it may be used for a sink, shower, washing machine.

3) it may be used in a restraint, hair shop, swimming pool.

4) it may be used to change purified water to low concentration water.

As for the first approach using the ozone containing water, for injecting the ozone gas through the Venturi tube, the dissolver tube 110 diameter should be larger than the connection pipe diameter. In this way, the ozone gas may be prevented from the counter-flow. When the connection pipe diameter is larger than the dissolver tube diameter, the ozone gas may be counter-flowed. As for the first approach, since an external energy source applies a pressure, a pressure generated from the dissolver tube 110 itself may not mainly influence. That it, when the pressure is required, an external pressure may be raised.

As for the second approach using the ozone free water, the pressure of the dissolver tube 110 may be important rather than the diameter thereof. As for the second approach, since without the external energy source, the dissolver tube itself changes the gas or liquid, an momentarily higher pressure may be required. This pressure may change based on a structure of the micro-hole 166.

For the purpose of the sterilization, the dissolver tube 110 pressure should be higher than the connection pipe pressure. However, for the purpose of not the sterilization but softening the water, the dissolver tube 110 pressure may be lower than the connection pipe pressure. That is, the water amount may increase.

As for the first approach using the ozone containing water, the mesh screen 160 souled have a coating made of a material such as gold or platinum having a resistance against the ozone. Otherwise, the mesh screen 160 may be corrosive due to the ozone.

As for the second approach using the ozone free water, the metal coating may not be required although sliver, or gold or other specific materials may be coated to improve the sterilization power.

Figure 15:
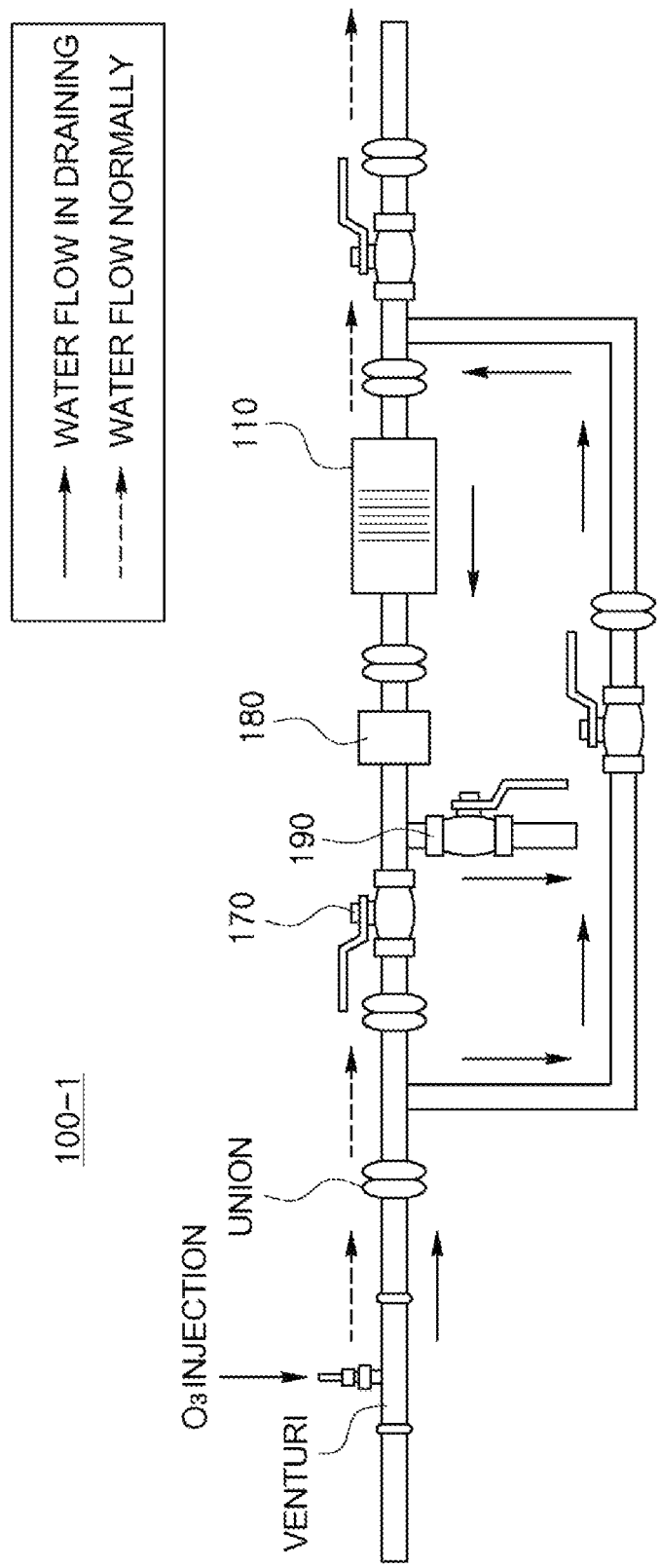
FIG. 15 to FIG. 17 illustrate example applications to an approach using the ozone containing water and an approach using the ozone free water.
Figure 16:
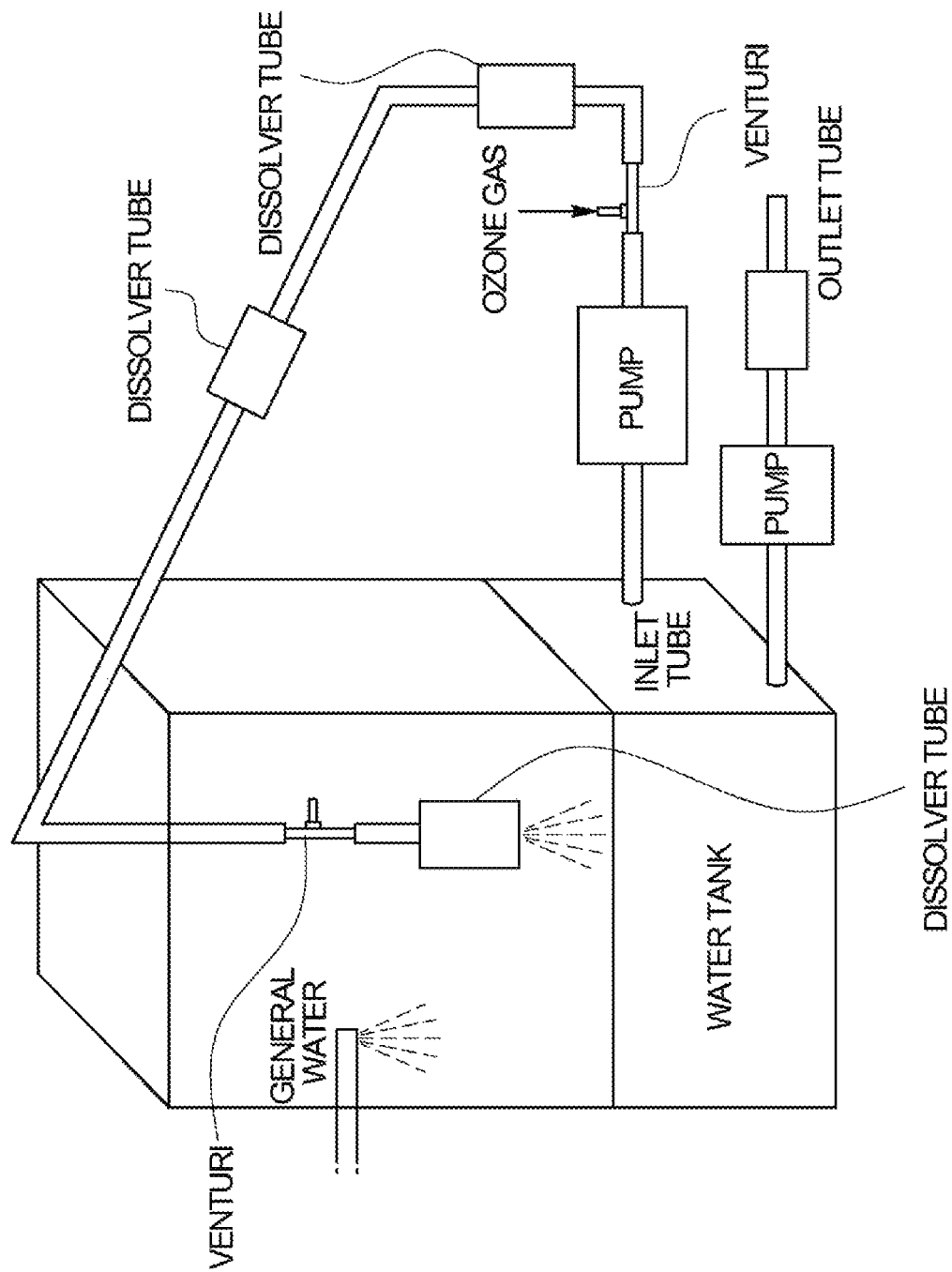
Figure 17:
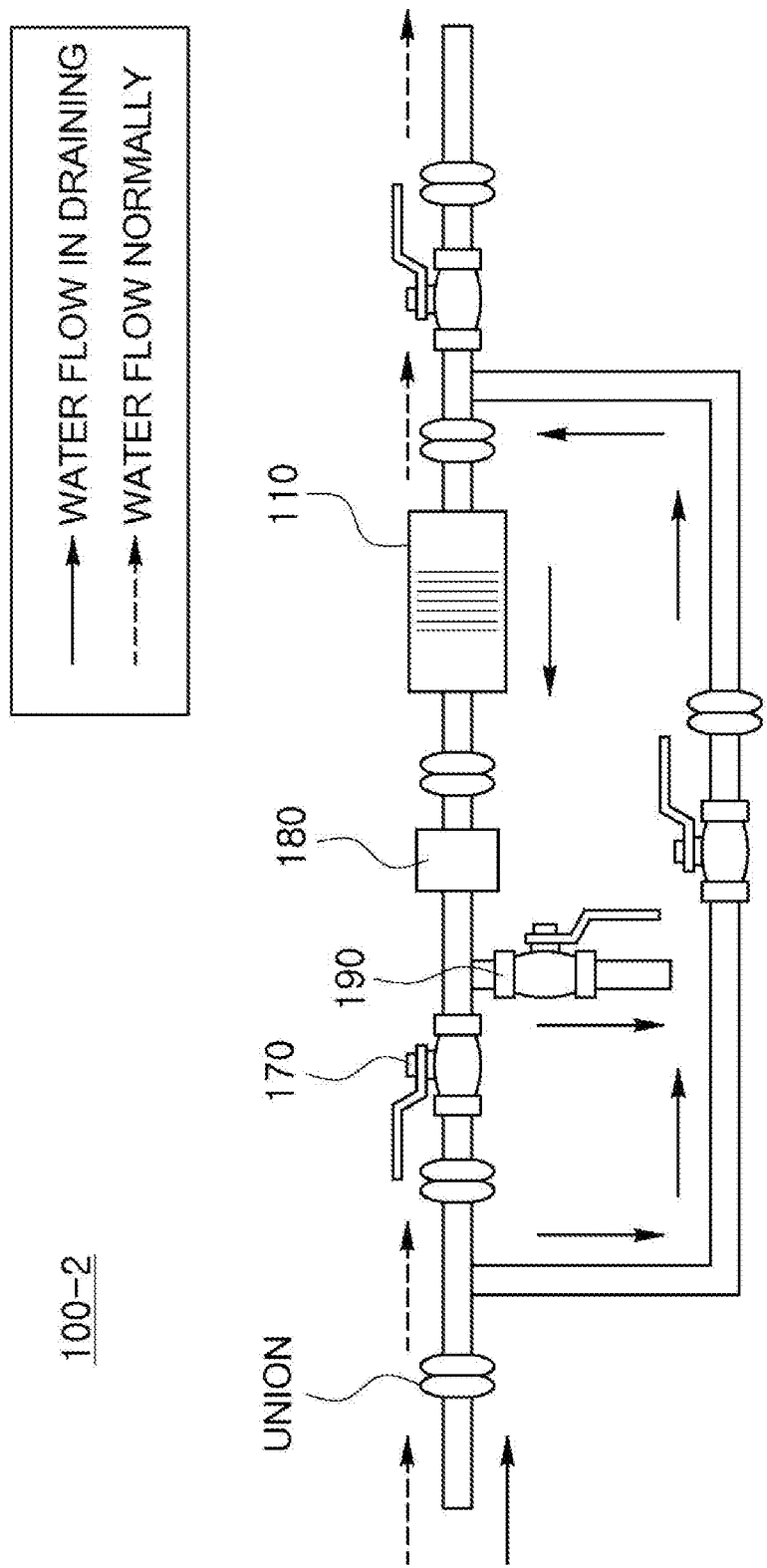

FIG. 15 to FIG. 17 illustrate example applications to an approach using the ozone containing water and an approach using the ozone free water.

FIG. 15 illustrates the approach 100-1 using the ozone containing water. FIG. 16 illustrates an example application to the approach using the ozone containing water. FIG. 17 illustrates the approach 100-2 using the ozone free water.

The approach using the ozone containing water as shown in FIG. 15 may be different from the approach using the ozone free water as shown in FIG. 16 in that the former approach further includes a Venturi tube for the ozone dissolution.

Figure 18:
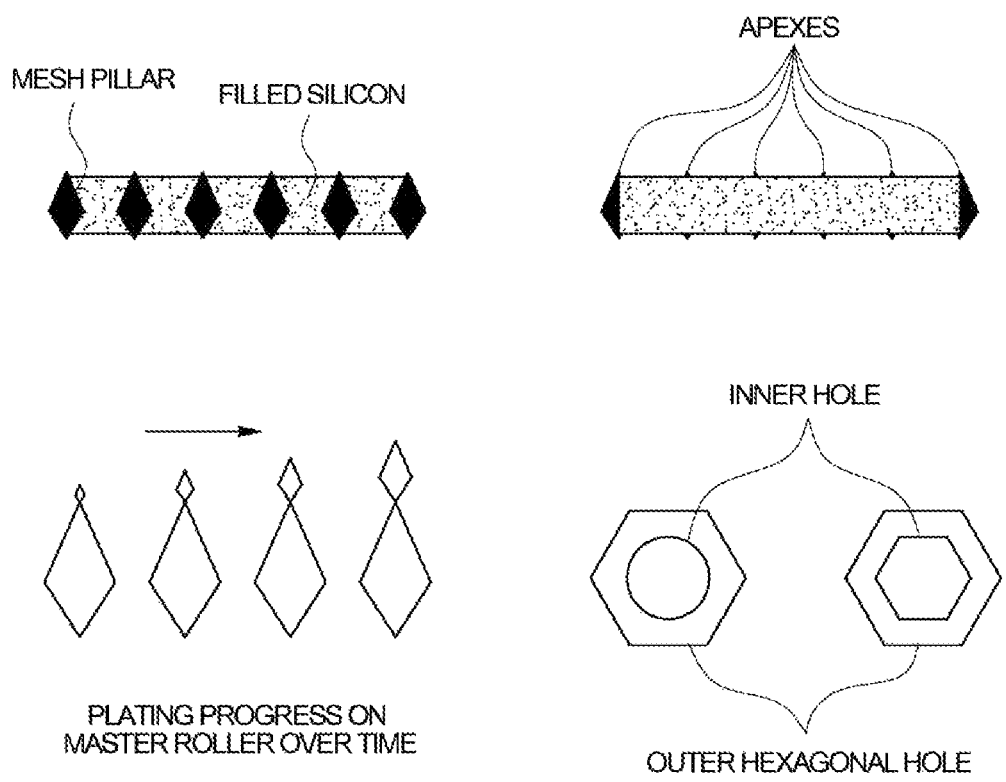
FIG. 18 illustrates a diagram to describe a method for electroforming a mesh screen in accordance with the present disclosure.

FIG. 18 illustrates a diagram to describe a method for electroforming a mesh screen in accordance with the present disclosure.

Referring to FIG. 18, using a master screen roller 128 filled with an electrical insulator except for a linear exposed portion with a very narrow width, an electroforming process is conducted twice, to form a mesh screen 160 with the Venturi structure.

In this connection, the electroforming may be different from a plating process.

The electroforming may allow a continuous production of copies using the master screen roller. The plating may not allow a continuous production of copies but a 1:1 production. The electroforming may be more difficult than the plating.

Further, the plating may be conducted in a stationary state, while the electroforming may be conducted with rotation of a thin film screen roller 130.

Specifically, silicon may be filled between Venturi structured micro-holes formed in the screen roller, and, then, a surface of the roller may be polished to form a master screen roller only with exposed apexes. Using the master screen roller, a first electroforming is conducted to form a thin film screen roller 130. The thin film screen roller 130 is subjected to a second electroforming, to form a screen roller with the same structure as an original screen roller.

In this connection, a rhombus with upper faces lengths being different from lower faces lengths may result from the fact that an amount of an electroformed portion increases over time. That is, at an initial time of the electroforming, a precipitation may occur at a very small region, but over time, a precipitation may occur at a larger region.

The steps where the silicon is filled between the Venturi structured micro-holes formed in the screen roller, and, then, a surface of the roller is polished to form the master screen roller only with exposed apexes may be very critical in the electroforming process.

This is because, during electroforming a screen roller, for example, having a height 198 cm, a diameter 20 cm, a thickness 100 µm, and a line number 135, 1) when the silicon is not filled in a single micro-hole, a thin film screen roller may not be detached well or may be deformed after the master screen roller is subjected to the electroforming;

2) when the tip end of the micro-hole is not polished well, the thin film screen roller may be broken;

3) when the tip end of the micro-hole is not polished well, the silicon filled into the micro-hole may leak out, and, thus, the master screen roller may be worse;

4) as the master screen roller is repeatedly used, the silicon may leak out, and, thus, the master screen roller may be worse.

Figure 19:
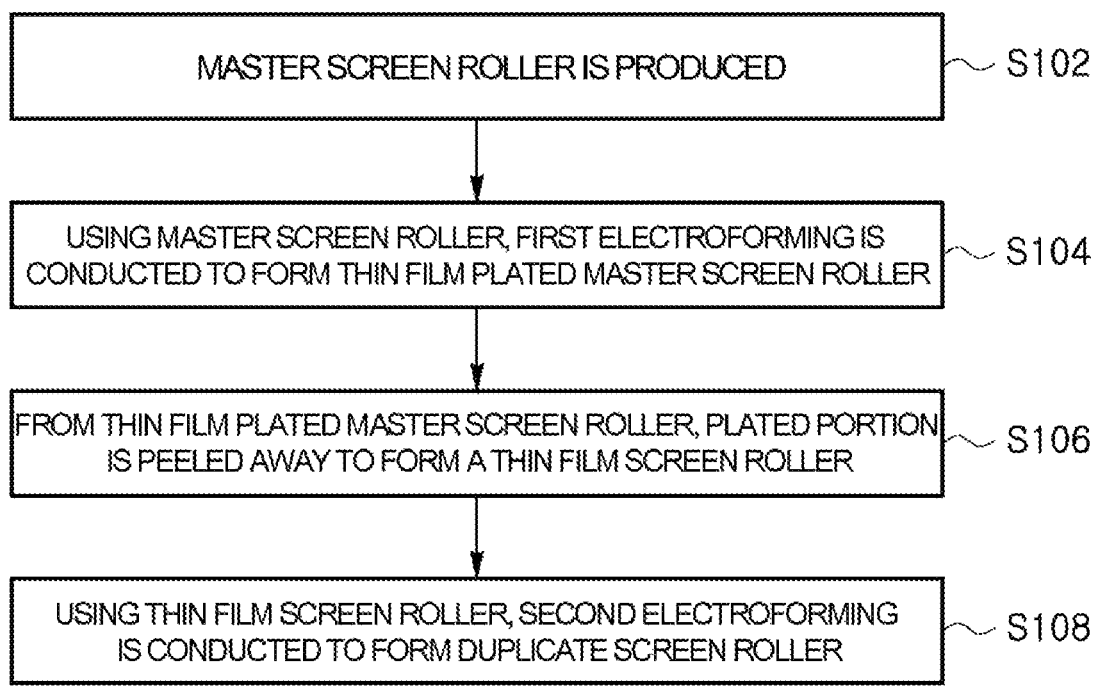
FIG. 19 illustrates a flow chart of a method for manufacturing a screen roller in accordance with the present disclosure.

FIG. 19 illustrates a flow chart of a method for manufacturing a screen roller in accordance with the present disclosure.

First, using a method as described referring to FIG. 18, the master screen roller may be produced S102.

Then, using the master screen roller, a first electroforming is conducted to form a thin film plated master screen roller S104.

From the thin film plated master screen roller, the plated portion is peeled away to form a thin film screen roller 130 S106.

Using the thin film screen roller 130, a second electroforming is conducted to form a duplicate screen roller S108.

In this connection, the thin film screen roller 130 may have 40 µm thickness, and the duplicate screen roller may have 100 to 120 µm thickness. Because the duplicated screen roller with 100 µm thickness is not directly obtained from the master screen roller, the first electroforming is conducted to form the thin film screen roller 130, and, then, using the thin film screen roller 130, the second electroforming is conducted to acquire the screen roller.

When the 100 µm thickness portion is directly stacked on the master screen roller, following problems may occur:

1) the master screen roller may be too thick to be peeled away. Thus, the master screen roller may not be used for a long time.

2) when the master screen roller is contained in a solution for a long time, the filled silicon may not last. For a shorter time, the master screen roller is contained in the solution, the longer the master screen roller lasts.

3) the plating may be invaded into the silicon filled in the master screen roller.

4) the master screen roller may be plated only on one side, to lead to a slow coating rate.

5) the roller may be rigid when the thin film may have a strength channel in and out of the thin film.

6) in plating the master screen roller, a partial plating may be peeled off to lead to a stacked plating.

Figure 20:
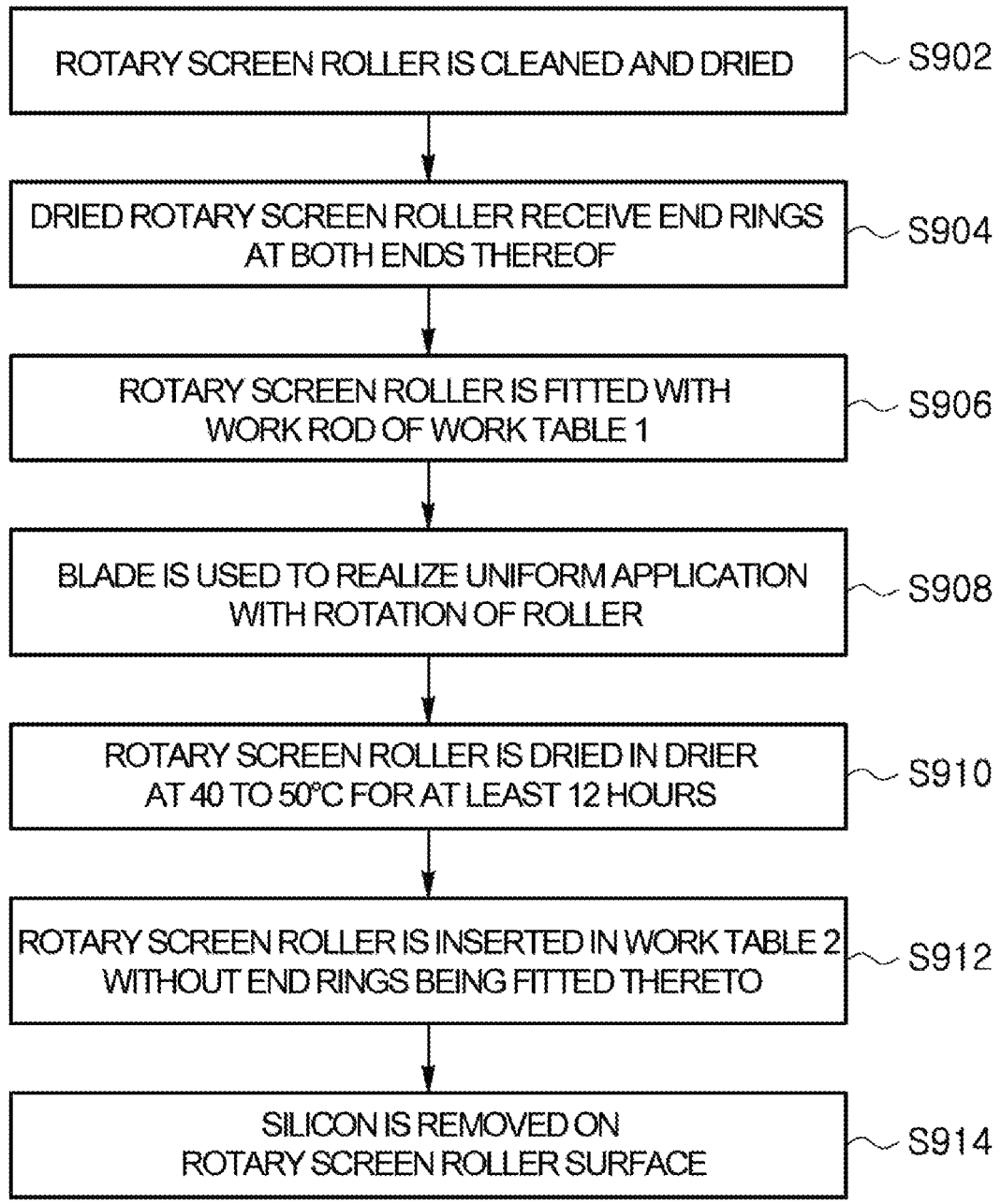
FIG. 20 illustrates a flow chart of a method for manufacturing a master screen roller as shown in FIG. 19.

FIG. 20 illustrates a flow chart of a method for manufacturing a master screen roller as shown in FIG. 19.

First, one piece of a rotary screen roller is cleaned and dried S902. The rotary screen roller may be cylindrical and have micro-holes arranged in a grid, each micro-hole having the Venturi structure. The sizing and arrangement of the micro-holes may correspond to those of the mesh screen 160. The micro-holes of the rotary screen roller may be arranged in a grid pattern. The micro-holes may be filled with the silicon. The surface of the roller may be smoothened to leave apexes of the rhombus exposed.

The dried rotary screen roller may receive end rings at both ends thereof S904.

The end rings may act to horizontally balance a rotation axis when rotating the rotary screen roller with being inserted into a work table 1.

The rotary screen roller may be fitted with a work rod of the work table 1 S906.

On the work table 1, the work rod may be disposed in a ladder shape extending horizontally. While the work rod receiving the rotary screen roller rotates, the silicon may be applied thereto. The work rod may impose an elastic repulsive force against the application force when applying the silicon on the rotary screen roller, to facilitate the silicon application.

The silicon (silicon sealant having small diameter particles, nonconductive) may be applied from one end by a distance 20 to 30 cm.

A blade may be used to realize a uniform application while 360 degrees rotation of the roller S908.

The blade should have a smooth face. A pressure force of the blade should not exceed an outward force of the roller via an elasticity.

This is because, otherwise, the rotary screen roller may be damaged, and, further, the silicon may be filled into the rotary screen roller very much to lead to the damage of the rotary screen roller during the polishing. Thus, the pushing force of the rotary screen roller and the pressure of the blade should be equal to each other.

This is because of followings.

1) the rotary screen roller may have the damage.
2) when the silicon may be filled into the rotary screen roller very much to lead to the damage of the rotary screen roller during the polishing.
3) any pores should not be contained in the silicon in the micro-hole of the rotary screen roller.

When the silicon is applied to the rotary screen roller, the silicon should remain on the surface of the rotary screen roller as little as possible. This may facilitate a subsequent operation and the rotary screen roller may have little damages.

Upon completion of the application, the rotary screen roller is withdrawn from the work table 1 and is dried in a drier at 40 to 50° C. for at least 12 hours S910.

Upon completion of the drying operation, the rotary screen roller having the silicon therein is inserted in a work table 2 without end rings being fitted thereto S912.

Using a clean and soft cloth, the silicon may be removed on the rotary screen roller surface with a given pressure (excessive pressure may cause a damage in the rotary screen roller) S914.

When the silicon is completely removed, the hand feels none of obstacles in touching the surface of the rotary screen roller, and the color of the surface may render a color of an original rotary screen roller.

Figure 21:
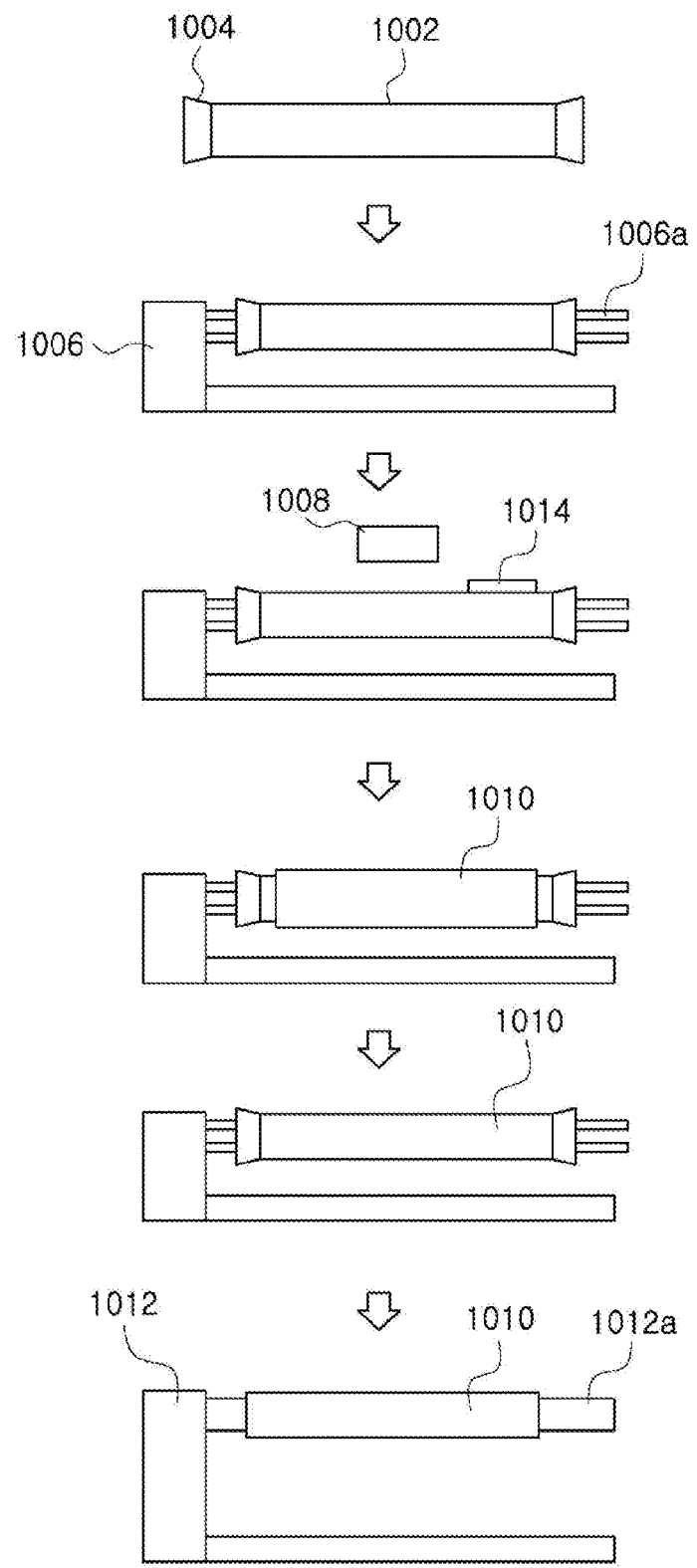
FIG. 21 diagrammatically illustrates a process for manufacturing the master screen roller as shown in FIG. 20.

FIG. 21 diagrammatically illustrates a process for manufacturing the master screen roller as shown in FIG. 20.

Referring to FIG. 21, while a rotary screen roller 1002 receives end rings 1004 at both ends thereof, the rotary screen roller 1002 is fitted with a work rod 1006*a* of a work table 1 1006.

while the rotary screen roller is rotated, silicon 1004 is applied to the roller using a blade 1008.

Thereafter, a dried rotary screen roller 1010 is fitted with a work rod 1012*a* of a work table 2 1012, and, then, the surface of the roller is cleaned using a cloth to smoothen the surface.

When the silicon is completely removed, the hand feels none of obstacles in touching the surface of the rotary screen roller, and the color of the surface may render a color of an original rotary screen roller.

Figure 22:
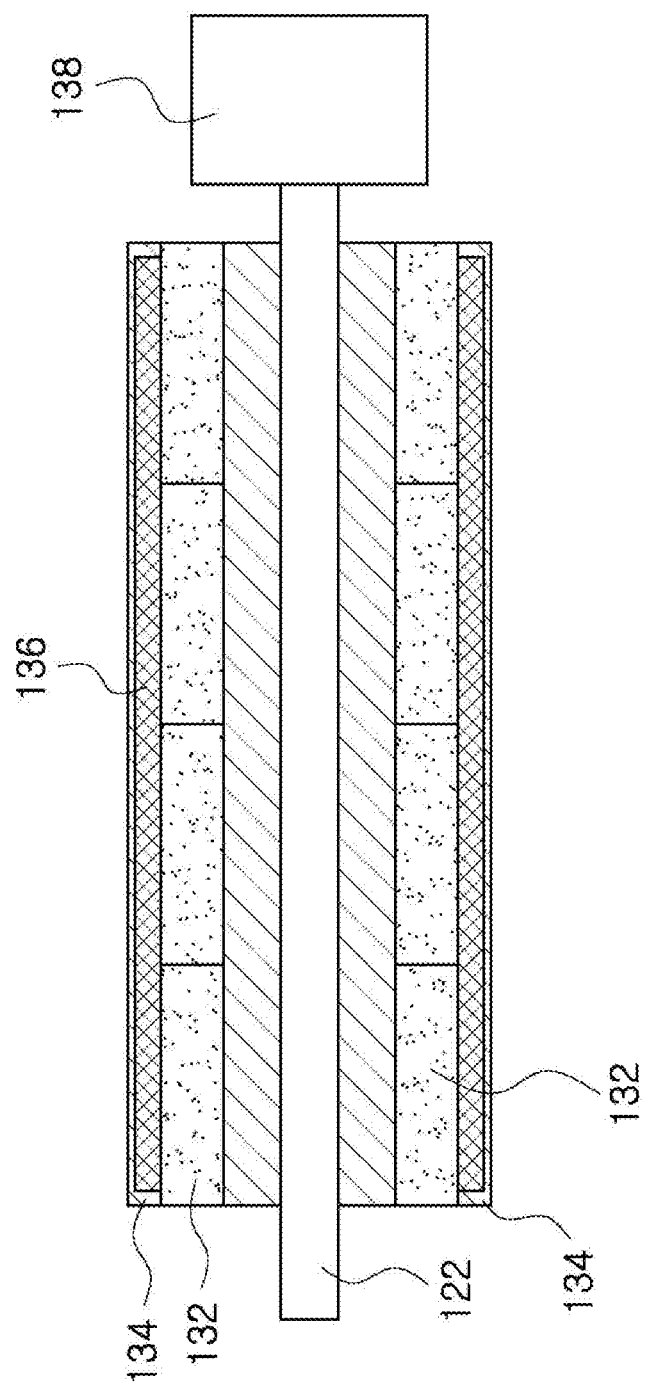
FIG. 22 illustrates a top view of an electroforming device in accordance with the present disclosure.

FIG. 22 illustrates a top view of an electroforming device in accordance with the present disclosure.

Referring to FIG. 22, the electroforming device may include a rotation axis 122, an outer basket 132, a copper bar 134, a plating bath 136 and a driver motor 138.

The rotation axis 122 may rotate via a rotation of the driver motor 138, and may extend through the plating bath 136. In the plating bath 136, the outer basket 132 and copper bar 134 may be disposed. The copper bar 134 may act to supply a power to the outer basket 132.

Figure 23:
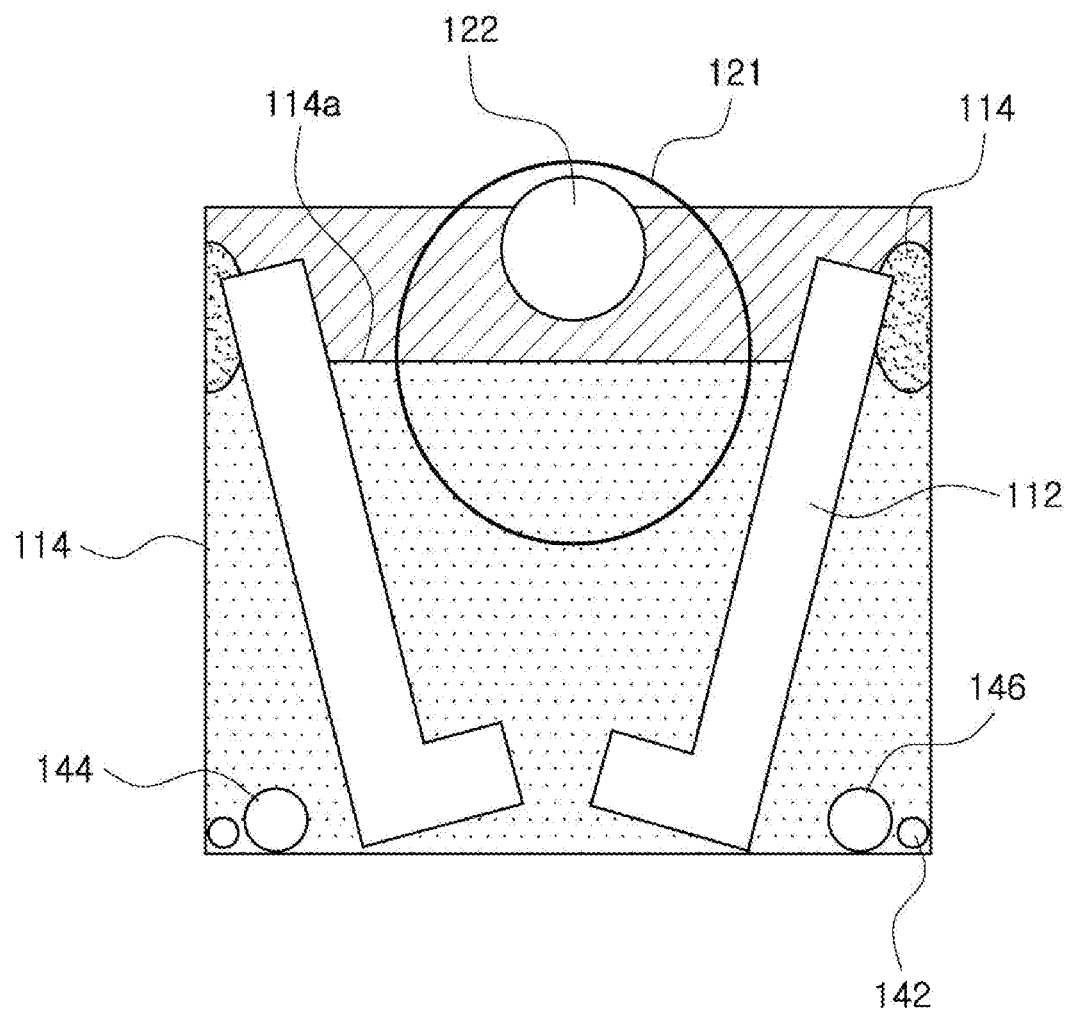
FIG. 23 illustrates a side elevation view of an electroforming device in accordance with the present disclosure.

FIG. 23 illustrates a side elevation view of an electroforming device in accordance with the present disclosure.

Referring to FIG. 23, the rotation axis 122, outer basket 132, master screen roller 128 are shown.

The rotation axis 122 may be coupled to a motor. A negative electrode for electroforming may be coupled to the rotation axis. While the master screen roller 128 is held on the rotation axis 122, the master screen roller 128 may rotate. The rotation axis 122 may vary in a vertical level thereof. The outer basket 132 may be fixed not to contact the master screen roller 128.

A positive electrode for electroforming may be coupled to the outer basket 132. An inner basket 124 may be used to contain therein a precipitation for plating.

A heating line 142 may be configured to heat the plating bath 136. An outlet tube 144 and inlet tube 146 may act to remove contaminants in the solution and allow a uniform temperature.

Figure 24:
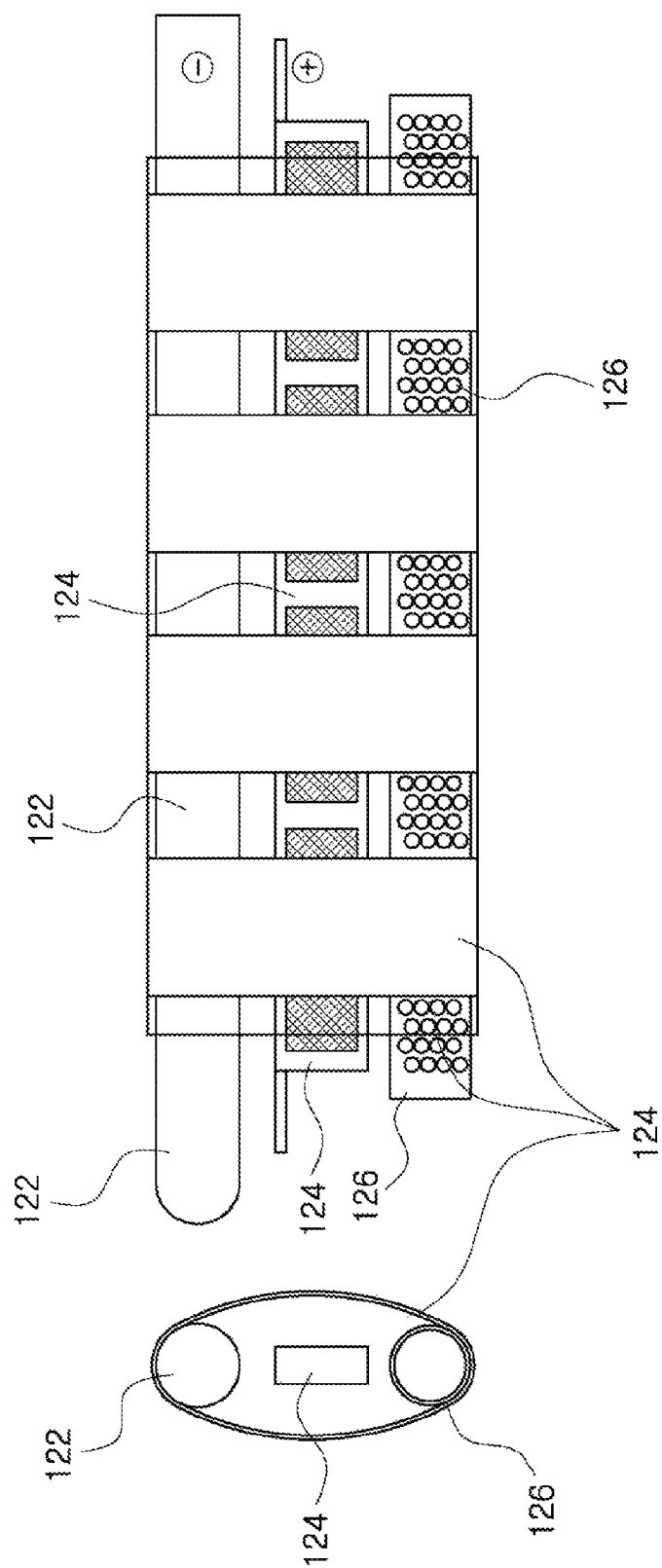
FIG. 24 illustrate a diagrammatic configuration to produce a duplicate screen roller from a thin film screen roller using an electroforming device in accordance with the present disclosure.

FIG. 24 illustrate a diagrammatic configuration to produce a duplicate screen roller from a thin film screen roller using an electroforming device in accordance with the present disclosure.

Referring to FIG. 24, the thin film screen roller 130 may rotate while held on the rotation axis 122, and the thin film screen roller 130 may receive the inner basket 124 and balancing rod 126.

The positive electrode for the electroforming may be coupled to the outer basket 132 and inner basket 124. The inner basket 124 may serve to contain a precipitation for plating.

Figure 25:
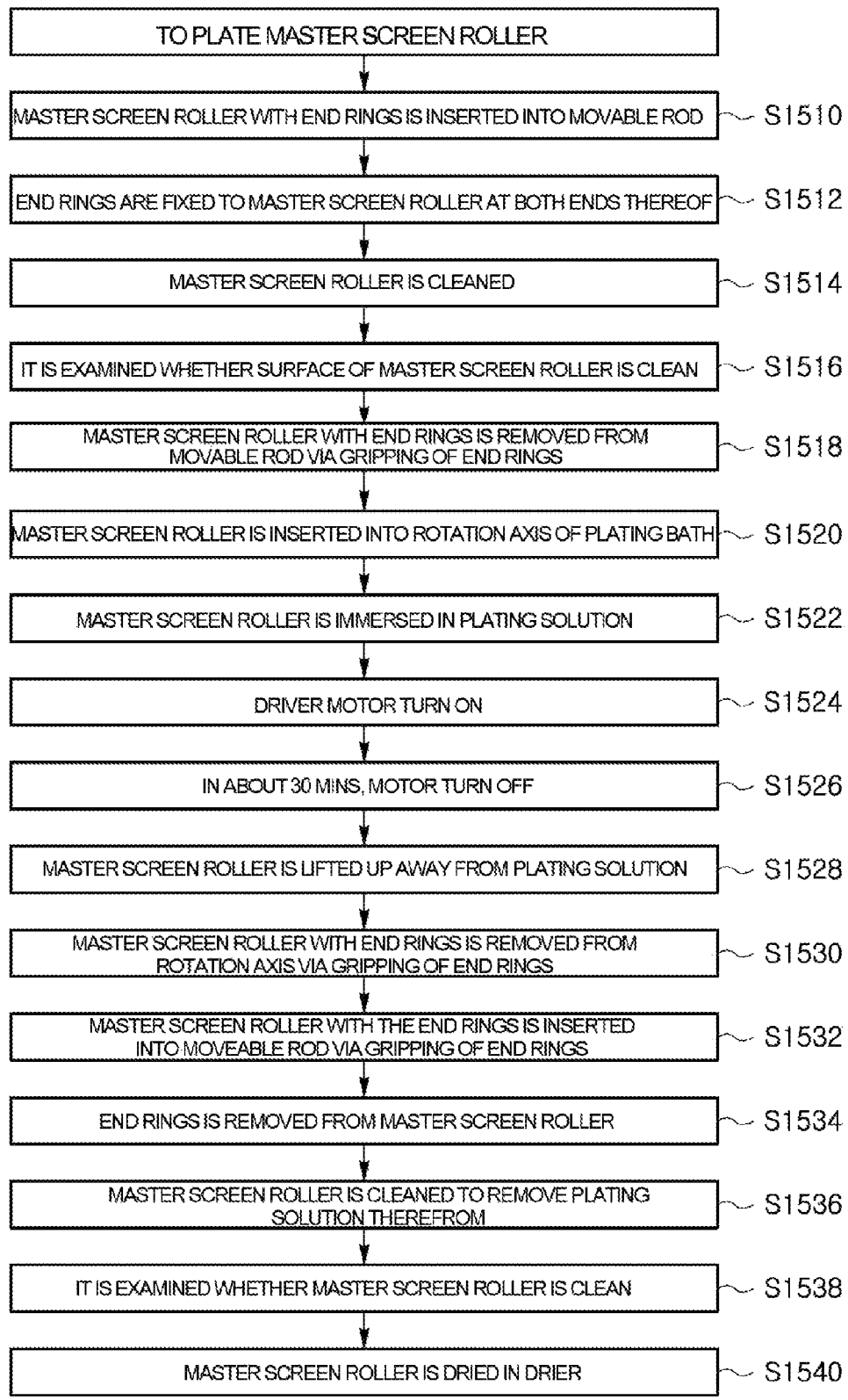
FIG. 25 illustrates a flow chart of a method for plating the master screen roller using the device as shown in FIG. 22 and FIG. 23.

FIG. 25 illustrates a flow chart of a method for plating the master screen roller using the device as shown in FIG. 22 and FIG. 23.

In accordance with the present disclosure, in order to obtain the duplicate screen roller, a first electroforming may be conducted to form a thin film screen roller 130.

First, the master screen roller with end rings may be inserted into a movable rod S1510. The end rings may be fixed to the master screen roller at both ends thereof S1512. The master screen roller may be cleaned S1514. It may be examined whether a surface of the master screen roller is clean S1516. The master screen roller with the end rings may be removed from the movable rod via the gripping of the end rings S1518.

Subsequently, the master screen roller may be inserted into the rotation axis 122 of the plating bath 136 S1520. The master screen roller may be immersed in a plating solution S1522.

A driver motor may turn on S1524.

In about 30 mins, the motor may turn off S1526.

The master screen roller may be lifted up away from the plating solution S1528.

The master screen roller with the end rings may be removed from the rotation axis via the gripping of the end rings S1530.

The master screen roller with the end rings may be inserted into the moveable rod via the gripping of the end rings S1532.

The end rings may be removed from the master screen roller S1534.

The master screen roller may be cleaned to remove the plating solution therefrom S1536.

It may be examined whether the master screen roller is clean S1538.

The master screen roller may be dried in a drier S1540.

Figure 26:
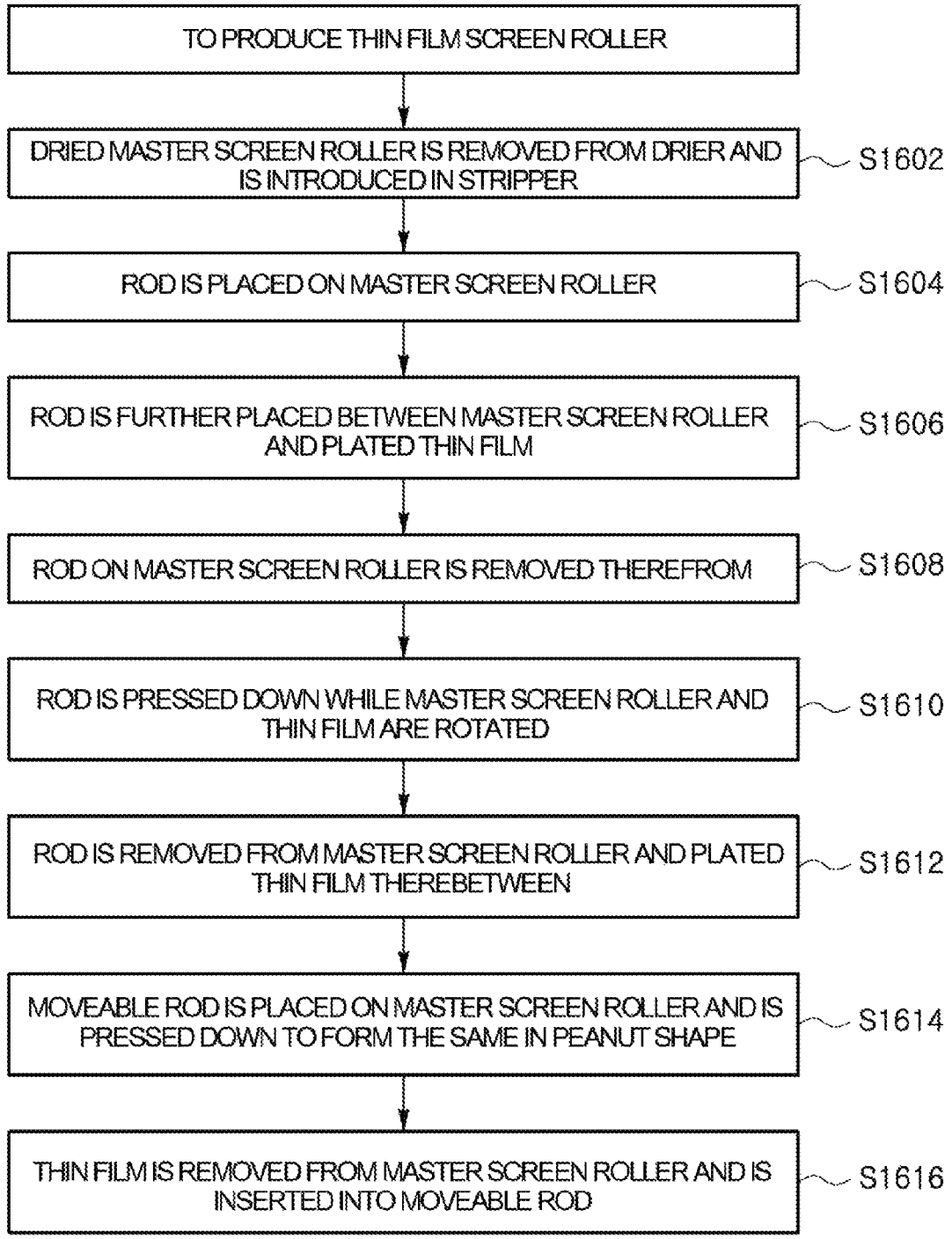
FIG. 26 illustrates a method for producing a thin film screen roller from a thin film plated master screen roller.

FIG. 26 illustrates a method for producing a thin film screen roller from a thin film plated master screen roller.

First, the dried master screen roller may be removed from the drier and may be introduced in a stripper S1602. A rod may be placed on the master screen roller S1604. A rod may be further placed between the master screen roller and the plated thin film S1606. The rod on the master screen roller may be removed therefrom S1608. The rod may be pressed down while the master screen roller and thin film are rotated by 360 degrees S1610. The rod may be removed from the master screen roller and plated thin film therebetween S1612. A moveable rod may be placed on the master screen roller and may be pressed down to form the same in a peanut shape S1614.

The thin film may be removed from the master screen roller and may be inserted into the moveable rod S1616.

Figure 27:
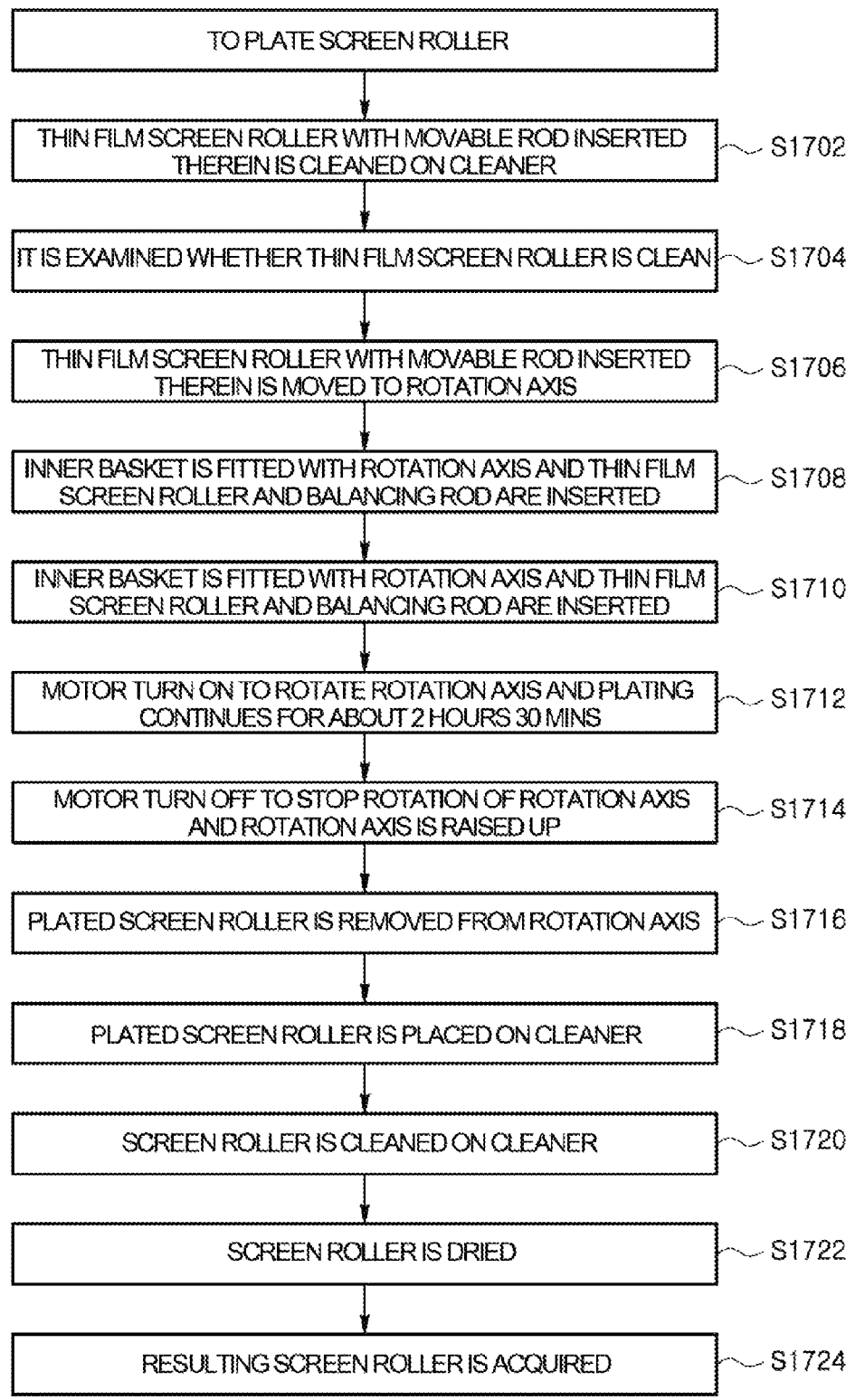
FIG. 27 illustrates a method for producing a duplicate screen roller from a thin film screen roller using an electroforming device in accordance with the present disclosure.

FIG. 27 illustrates a method for producing a duplicate screen roller from a thin film screen roller using an electroforming device in accordance with the present disclosure.

In accordance with the present disclosure, a second electroforming may be conducted to produce a duplicate screen roller from the thin film screen roller 130. In this connection, the thin film screen roller 130 has a small thickness. Thus, while the thin film screen roller 130 is rotated while the rotation axis 122 is inserted thereinto, a center of gravity is required. The balancing rod 126 may be inserted into the thin film screen roller to act as the center of gravity.

Further, in order to plate inner and outer faces of the thin film screen roller, in addition to the outer basket 132, an inner basket 124 may be disposed in the thin film screen roller.

First, the thin film screen roller with a movable rod inserted therein may be cleaned on a cleaner S1702.

it may be examined whether the thin film screen roller is clean S1704. The thin film screen roller with a movable rod inserted therein may be moved to the rotation axis 122 S1706. The inner basket 124 may be fitted with the rotation axis 122 and the thin film screen roller and balancing rod may be inserted S1708.

The rotation axis 122 may be lowered down such that the inner basket 124 and thin film screen roller 130 are immersed in the plating solution S1710. The motor may turn on to rotate the rotation axis 122 and the plating continues for about 2 hours 30 mins S1712. The motor may turn off to stop the rotation of the rotation axis 122 and the rotation axis 122 may be raised up (in case the rotation and the plating operations share the same power supply) S1714.

The plated screen roller may be removed from the rotation axis 122 S1716. The plated screen roller may be placed on a cleaner. The plating solution may be caused not to drop S1718. The screen roller may be cleaned on the cleaner S1720. The screen roller may be dried S1722. The resulting screen roller may be acquired S1724.

Figure 28:
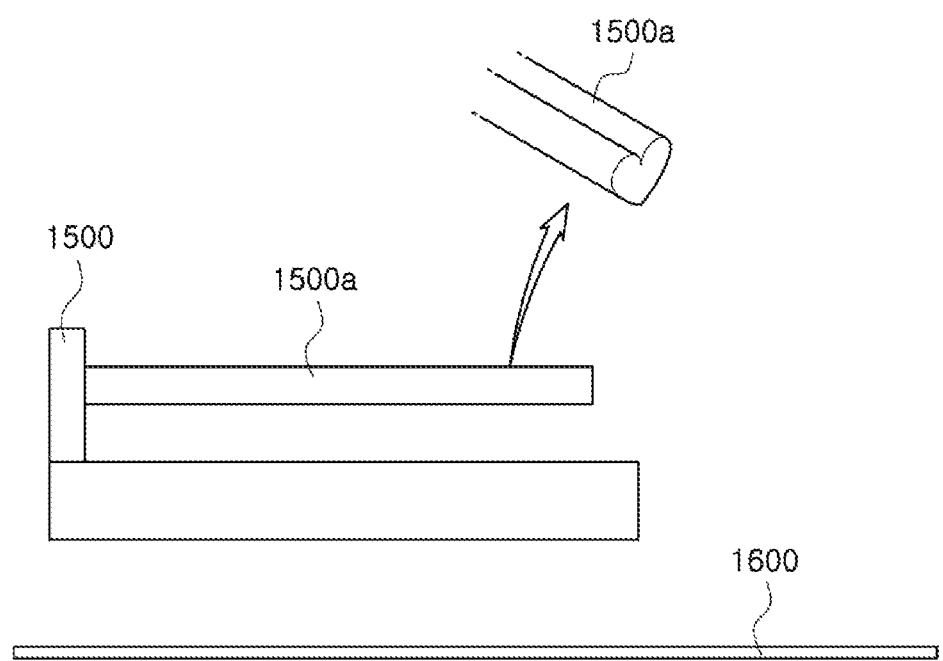
FIG. 28 illustrates a stripper for peeling away the thin film screen roller.

FIG. 28 illustrates a stripper for peeling away the thin film screen roller. The stripper 1500 may have a work rod 1500a in a heart (♥) shape. The electroformed thin film screen roller 130 may be fitted with the work rod 1500a and a recessed portion in the heart (♥) shape may be pressed down.

Thus, the thin film screen roller 130 may be released from the master screen roller 128.

An elongated separation rod 1600 may be inserted into the thin film screen roller 130, and, using the work rod 1500a, the thin film screen roller 130 may be slowly rotated, such that, along the elongated separation rod, the thin film screen roller 130 may be released from the master screen roller 128.

Figure 29:
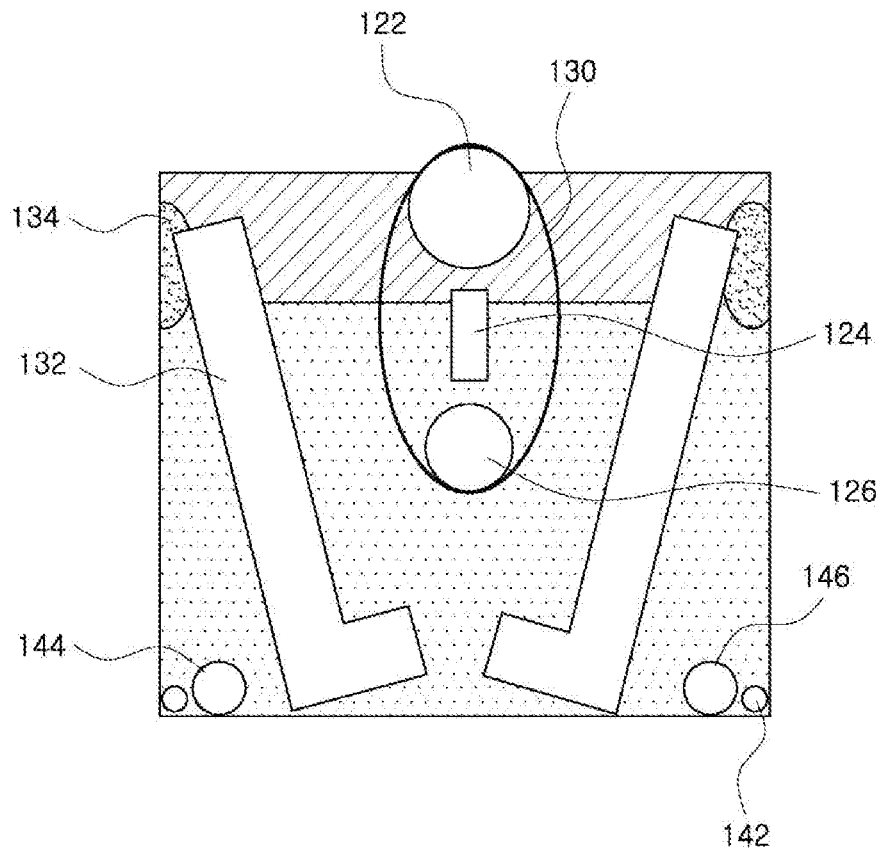
FIG. 29 illustrates a diagrammatic configuration of plating a duplicate screen roller using a thin film screen roller.

FIG. 29 illustrates a diagrammatic configuration of plating a duplicate screen roller using a thin film screen roller.

Referring to FIG. 29, the rotation axis 122, inner basket 124, balancing rod 126, and thin film screen roller 130 are shown.

The rotation axis 122 may be coupled to a motor to rotate therewith and may be coupled to a negative electrode for electroforming. While the thin film screen roller 130 is held one the rotation axis 122, the inner basket 124 and balancing rod 126 may be inserted in the thin film screen roller 130. The inner basket 124 may be fixed not to contact the thin film screen roller 130. The balancing rod 126 may be disposed in the thin film screen roller 130. The balancing rod 126 may act to allow the thin film screen roller 130 to be formed in a circular shape during the electroforming. That is, without the balancing rod 126, the thin film screen roller 130 may be formed in an elliptical shape during the rotation thereof. The balancing rod 126 may prevent the thin film screen roller 130 from being wound around the rotation axis 122.

Further, the balancing rod 126 may act to allow the thin film screen roller 130 to be formed in a circular shape during the electroforming. That is, the balancing rod 126 may act to maintain a center of gravity.

The balancing rod 126 may act as a variable rotation axis in addition to the rotation axis 122. Without the balancing rod 126, the thin film screen roller 130 may not be formed in a circular shape. The balancing rod 126 may have holes formed at a surface thereof.

The balancing rod 126 may be configured as follows (the balancing rod should be electrically non-conductive):

1) The rod thickness and length (a) the balancing rod 126 should be configured in a thickness such that:

the inner basket<the balancing rod≤rotation axis.

When the balancing rod 126 thickness is smaller than those of the rotation axis 122 and inner basket 124, the thin film screen roller may contact the inner basket 124 as a positive electrode to cause a spark.

(b) The balancing rod 126 length should be larger than the thin film screen roller 130 length.

EXAMPLE

The thin film screen roller 130 length may be 1980 mm and the balancing rod 126 length may be 2200 mm±α.

When the balancing rod 126 has a smaller length, the balancing rod 126 rotates at a tilted manner to be biased toward one side such that the thin film may be unbalanced and may be damage.

2) The rod weight

The balancing rod should be immersed initially and, over time, rise due to the electroforming force.

When the balancing rod is too heavy, the thin film may be damaged and the thin film screen roller 130 may not be formed in a circular shape.

When the balancing rod is too light, the thin film screen roller 130 may not be immersed in a flat manner.

EXAMPLE

The thin film screen roller 130 weight may be 200 g±α, the balancing rod 126 weight may be 3 kg±α.

3) Holes Formation

To distribute a weight of the balancing rod 126 uniformly, and to allow the balancing rod 126 to be rapidly immersed in the plating solution, the balancing rod 126 may have plurality of holes formed at the surface thereof.

The positive electrode for electroforming may be coupled to the inner basket 124. The inner basket 124 may contain a precipitation for plating.

Figure 30:
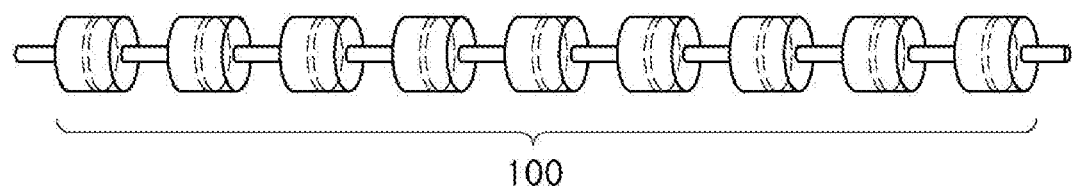
FIG. 30 illustrates ozone dissolution performance by the dissolver tube in accordance with the present disclosure.

FIG. 30 illustrates ozone dissolution performance by the dissolver tube in accordance with the present disclosure.

As shown in FIG. 30, nine dissolver tubes are arranged in series where each dissolver tube has one mesh screen. Using a home ozone sterilization device available from Dongwoo Tech, ozone water is fed to the arrangement of the nine dissolver tubes. Using a measurement device C105, a measurement is conducted. In this connection, the connection pipe has 10 mm diameter, and the dissolver tube has 10 mm diameter. Without a pump, that is, additional pressure, the waterworks water pressure only is used.

Referring to FIG. 30, ozone water with 0.37 or 0.39 ppm concentration passes through the arrangement of the nine dissolver tubes and, as a result, ozone water with 0.74 ppm concentration is acquired. That is, using the dissolver tube in accordance with the present disclosure, the ozone dissolution may be improved without additional ozone injection.

A following table 1 shows effects of the dissolver tube in accordance with the present disclosure.

TABLE 1

| Tube diameter (mm) | 25 mm | | 20 mm | | |
|---|---|---|---|---|---|
| Mesh screen configuration | 25 + 13 | | 30 + 20 | | |
| 10 g O$_3$ level | 3 | 2 | 2 | | Ozone tech 10 g |
| Pressure | 3 | 3 | 2 | 4 | Waterworks water pressure and no pump (no circulation) |
| L/H(water amount/hour) | | 440 | 335 | 471 | |
| Ozone measurement (ppm) | OR | 3.2 | 2.0 2.3 | 3.2 2.8 | C105 measurement device Over; at least 4.1 ppm |

In the above table 1, the connection pipe diameter is 15 mm, the dissolver tube diameter is 25 mm and 20 mm, a maximum output is ozone gas 10 g and is divided into 1 to 10 levels.

The level 2 and level 3 are tested. The level 3 refers to 3 g ozone injection, and the level 2 refers to 2 g ozone injection. As for the level 3, the measurement is OR (over), namely, at least 4.2 ppm ozone dissolution. As for the level 2, 2.0, 2.3, 2.8, and 3.2 ppm ozone dissolutions are achieved.

In this connection, OR (over) may refer to a value exceeding 4.1 ppm as a maximum measurement value of the measurement device.

As for the table 1, the arrangement of the tubes is not circular and but in serials. Thus, an instant dissolution may be very high. Without the pump, only a waterworks water pressure is used.

INDUSTRIAL ABILITY

The present disclosure relates a dissolver tube to improve water sterilization and/or dissolution of liquids or gas into water, and, more particularly, to a dissolver tube to momentarily continuously contract, relax and shear water passing therethrough to improve water sterilization and/or soften water and/or dissolution of liquids or gas into water, and a method for manufacturing a master screen roller for the tube.

What is claimed is:

1. A dissolver tube to generate a pressure change to a fluid to change a physical property of the fluid, the tube comprising:
    a hollow tubular outer body;
    an inlet cap coupled to the body at an inlet thereof;
    an outlet cap coupled to the body at an outlet thereof; and
    a plurality of mesh screens arranged between the inlet cap and outlet cap,
    wherein each mesh screen has a plurality of micro-holes formed therethrough, each micro-hole having a Venturi structure, thereby to momentarily continuously contract, relax, and shear the fluid passing through the tube.

2. The tube of claim 1, wherein the Venturi structure has a maximum constricted portion, and the plurality of micro-holes is arranged in a grid pattern.

3. The tube of claim 2, wherein each micro-hole has a first tilted face toward the maximum constricted portion and a second tilted face toward the maximum constricted portion, and the first and second tilted faces meet at the maximum constricted portion, wherein the first tilted face is shorter than the second tilted face.

4. The tube of claim 3, wherein each micro-hole is oriented such that the first tilted face thereof is located upstream of the second tilted face thereof in terms of a fluid flow direction.

5. The tube of claim 4, wherein each of the plurality of mesh screens extends in an angled manner to a flow path direction in the tube.

6. The tube of claim 5, wherein the plurality of mesh screens is divided into a plurality of groups and the groups are spaced from each other via a pad.

7. The tube of claim 1, wherein at least one of an inlet and outlet of the micro-hole is defined in a circular or polygonal shape.

8. The tube of claim 1, wherein each of the plurality of mesh screens extends in an angled manner to a flow path direction in the tube.

9. The tube of claim 1, wherein each of the plurality of mesh screens is plated with gold or platinum.

* * * * *